(12) United States Patent
Ohura et al.

(10) Patent No.: US 12,116,159 B2
(45) Date of Patent: Oct. 15, 2024

(54) PACKAGING MACHINE

(71) Applicant: Maruho Hatsujyo Kogyo Co., Ltd., Kyoto (JP)

(72) Inventors: Shigeru Ohura, Kyoto (JP); Akihiro Okada, Kyoto (JP)

(73) Assignee: MARUHO HATSUJYO KOGYO CO., LTD., Kyoto (JP)

( * ) Notice: Subject to any disclaimer, the term of this patent is extended or adjusted under 35 U.S.C. 154(b) by 387 days.

(21) Appl. No.: 17/615,467

(22) PCT Filed: May 11, 2020

(86) PCT No.: PCT/JP2020/018826
§ 371 (c)(1),
(2) Date: Nov. 30, 2021

(87) PCT Pub. No.: WO2020/241224
PCT Pub. Date: Dec. 3, 2020

(65) Prior Publication Data
US 2022/0234776 A1    Jul. 28, 2022

(30) Foreign Application Priority Data

May 30, 2019   (JP) ................................. 2019-100953

(51) Int. Cl.
*B65B 57/02*       (2006.01)
*B65B 11/52*       (2006.01)
(Continued)

(52) U.S. Cl.
CPC .............. *B65B 57/02* (2013.01); *B65B 11/52* (2013.01); *B65B 41/16* (2013.01); *B65B 47/04* (2013.01); *B65B 61/025* (2013.01); *G06T 7/70* (2017.01)

(58) Field of Classification Search
CPC ......... B65B 11/52; B65B 41/04; B65B 47/04; B65B 57/02; B65B 61/025
See application file for complete search history.

(56) References Cited

U.S. PATENT DOCUMENTS

2015/0353214 A1    12/2015   Gerstner et al.

FOREIGN PATENT DOCUMENTS

| JP | S5657604 A | 5/1981 |
| JP | S60167702 U | 11/1985 |

(Continued)

*Primary Examiner* — Thomas M Wittenschlaeger
*Assistant Examiner* — David G Shutty
(74) *Attorney, Agent, or Firm* — Ohlandt, Greeley & Perle, LLP

(57) ABSTRACT

A packaging machine includes an imager that images a packaging pack punched by a punching device, and a control device. The control device includes a position shift amount calculator that calculates, on the basis of a packaging pack image of the packaging pack captured by the imager, a punching position shift amount of a punching position of a pack film, a punching position correction amount calculator that calculates, from the punching position shift amount, a punching position correction amount with respect to the punching position of the pack film, a slit position controller that adjusts, on the basis of the punching position correction amount, a rotation angle of a film feeding roller, and a film guide position controller that adjusts, on the basis of the punching position correction amount, the position of a film guide.

19 Claims, 24 Drawing Sheets

(51) Int. Cl.
   *B65B 41/16*   (2006.01)
   *B65B 47/04*   (2006.01)
   *B65B 61/02*   (2006.01)
   *G06T 7/70*    (2017.01)

(56) References Cited

FOREIGN PATENT DOCUMENTS

| | | | |
|---|---|---|---|
| JP | S61254417 A | | 11/1986 |
| JP | S62235033 A | | 10/1987 |
| JP | 105338613 A | | 12/1993 |
| JP | H0660244 A | | 3/1994 |
| JP | 2005041560 A | * | 2/2005 |
| JP | 2007261775 A | | 10/2007 |
| JP | 2015157648 A | * | 9/2015 |

* cited by examiner

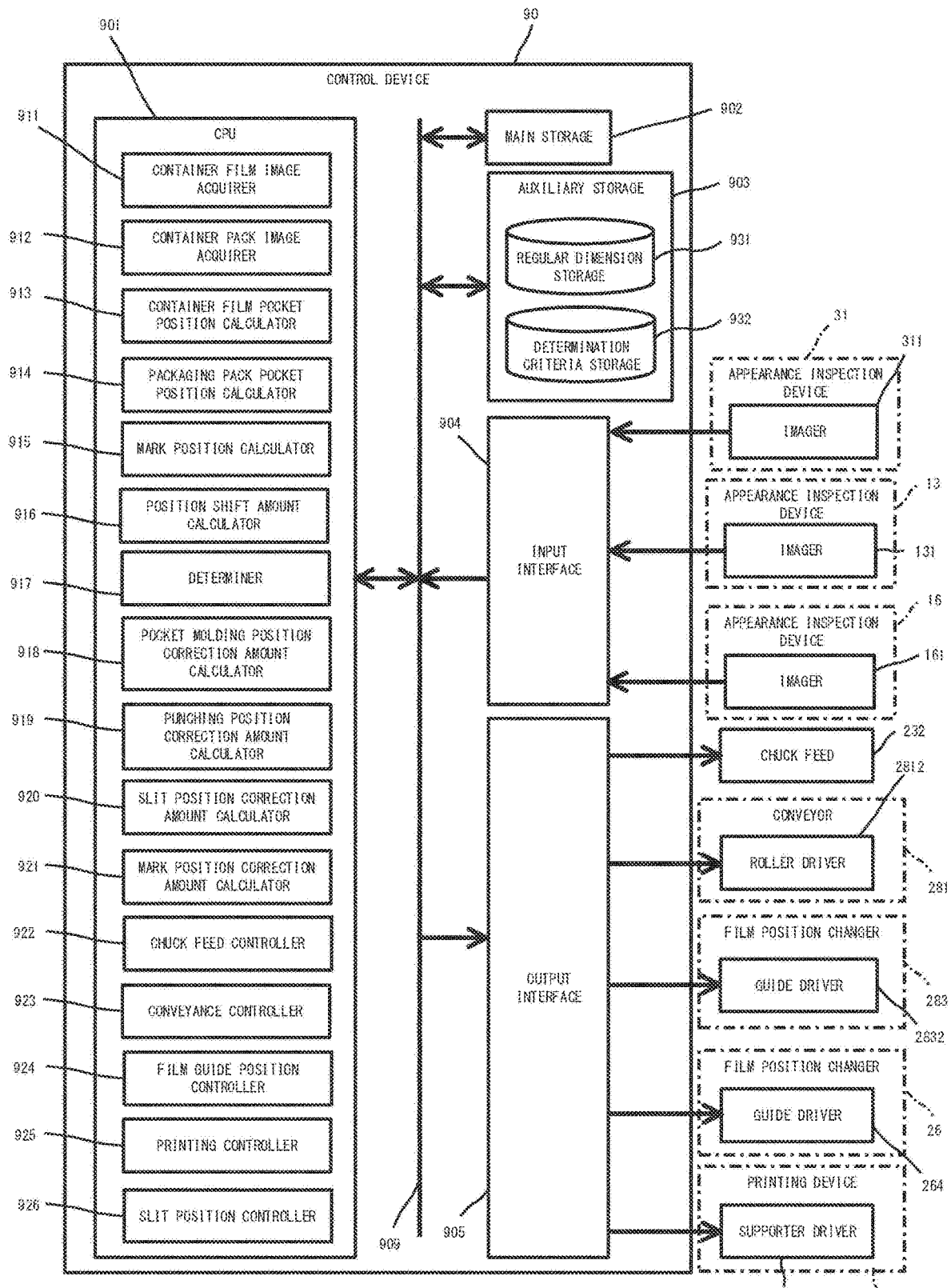

PACKAGING MACHINE

FIELD OF THE INVENTION

Technical Field

The present disclosure relates to a packaging machine.

Background of the Invention

PTP packaging machines have been proposed in which a belt-like container film on which pockets are formed is filled with contents and, then, a cover film provided with a printing section is affixed to the container film so as to close the pocket to form a PTP film and, then, the PTP film is punched to manufacture a planarly rectangular PTP sheet (for example, see Japanese Patent Application Publication No. 2015-157648). The PTP packaging machine described in JP 2015-157648 detects, for the punched PTP sheet, an amount of position shift from the ideal position of the pockets, and an amount of position shift from the ideal position of the printing section, and corrects the punching position of the PTP film on the basis of both of these two detected types of amounts of position shift. Additionally, the PTP packaging machine corrects the punching position in the extending direction of the PTP film by changing an angle of rotation per one drive of a film feeding roller to adjust a feed amount of the PTP film.

SUMMARY OF THE INVENTION

Technical Problem

However, there is a possibility of the punching position of the PTP film shifting in the width direction and not only in the extending direction of the PTP film. To address this, in the PTP packaging machine described in JP 2015-157648, the entire sheet punching device that punches the PTP film is moved in the width direction of the PTP film to correct the punching position. However, in this case, an additional driving mechanism is needed to move the entire sheet punching device and, as such, the size of the PTP packaging device tends to increase an amount corresponding to that additional driving mechanism. Moreover, there is a demand to reduce the labor in the process of fabricating packaging packs by using an imaging device to inspect the punched PTP packs.

The present disclosure is made with the view of the above situation, and an objective of the present disclosure is to provide a packaging machine whereby it is possible to reduce the size and reduce the labor in the process of fabricating packaging packs.

Solution to Problem

A packaging machine according to the present disclosure that achieves the objective described above is:

a packaging machine for manufacturing a packaging pack by punching, in a state in which a workpiece is stored in a pocket, for storing the workpiece, of a container film on which the pocket is formed, a belt-like pack film obtained by a cover film being adhered to the container film so as to close the pocket, the packaging machine including:

a first conveyor that includes a film feeding roller on which the pack film is wound, and that intermittently rotates the film feeding roller one predetermined rotation angle at a time to intermittently feed the pack film one predetermined first reference distance at a time;

a punching device that punches the pack film when the pack film intermittently conveyed by the first conveyor is stopped;

a first film position changer that includes a guider that is disposed downstream of the first conveyor and that guides the pack film, and that changes a position of the guider in a width direction of the pack film to change a position in the width direction of the pack film in the punching device;

a first imager that images the packaging pack punched by the punching device;

a position shift amount calculator that calculates, based on a packaging pack image of the packaging pack imaged by the first imager, a position shift amount of a punching position of the pack film by the punching device;

a punching position correction amount calculator that calculates, from the position shift amount of the punching position, a punching position correction amount with respect to the punching position;

a rotation angle adjuster that adjusts, based on the punching position correction amount, the rotation angle; and a guider position adjuster that adjusts, based on the punching position correction amount, the position of the guider.

Advantageous Effects of Invention

According to the present disclosure, the first film position changer includes the guider that guides the pack film, and changes the position of the guider in the width direction of the pack film to change the position in the width direction of the pack film in the punching device. Moreover, the punching position correction amount calculator calculates, from the position shift amount of the punching position, the punching position correction amount with respect to the punching position of the pack film, and the guider position adjuster adjusts the position of the guider on the basis of the punching position correction amount. As a result, correction of the punching position in the width direction of the pack film can be carried out without providing a drive mechanism for moving the entire punching device in the width direction of the pack film. Therefore, the size of the packaging machine can be reduced an amount corresponding to the drive mechanism for moving the entire punching device in the width direction of the pack film, that has been made unnecessary. Additionally, since the first imager images the packaging pack punched by the punching device, inspections of the packaging packs can be automated by using the images of the packaging packs captured by the first imager. Therefore, the labor in the process of manufacturing packaging packs can be reduced.

BRIEF DESCRIPTION OF THE DRAWINGS

FIG. 8 is a block diagram of a controller according to the embodiment;

DETAILED DESCRIPTION OF THE INVENTION

Hereinafter, a packaging machine according to embodiments of the present disclosure is described while referencing the drawings. The packaging machine according to the present embodiment is for manufacturing packaging packs such as blister packs, PTP packs, and the like. In this case, a "packaging pack" includes a container film in which pockets are formed to accommodate workpieces, and a cover film that is affixed to the container film so as to close the pockets. Examples of the workpieces include tube-shaped containers, tablets, food, electronic components, medical devices, and the like.

Figure 1:
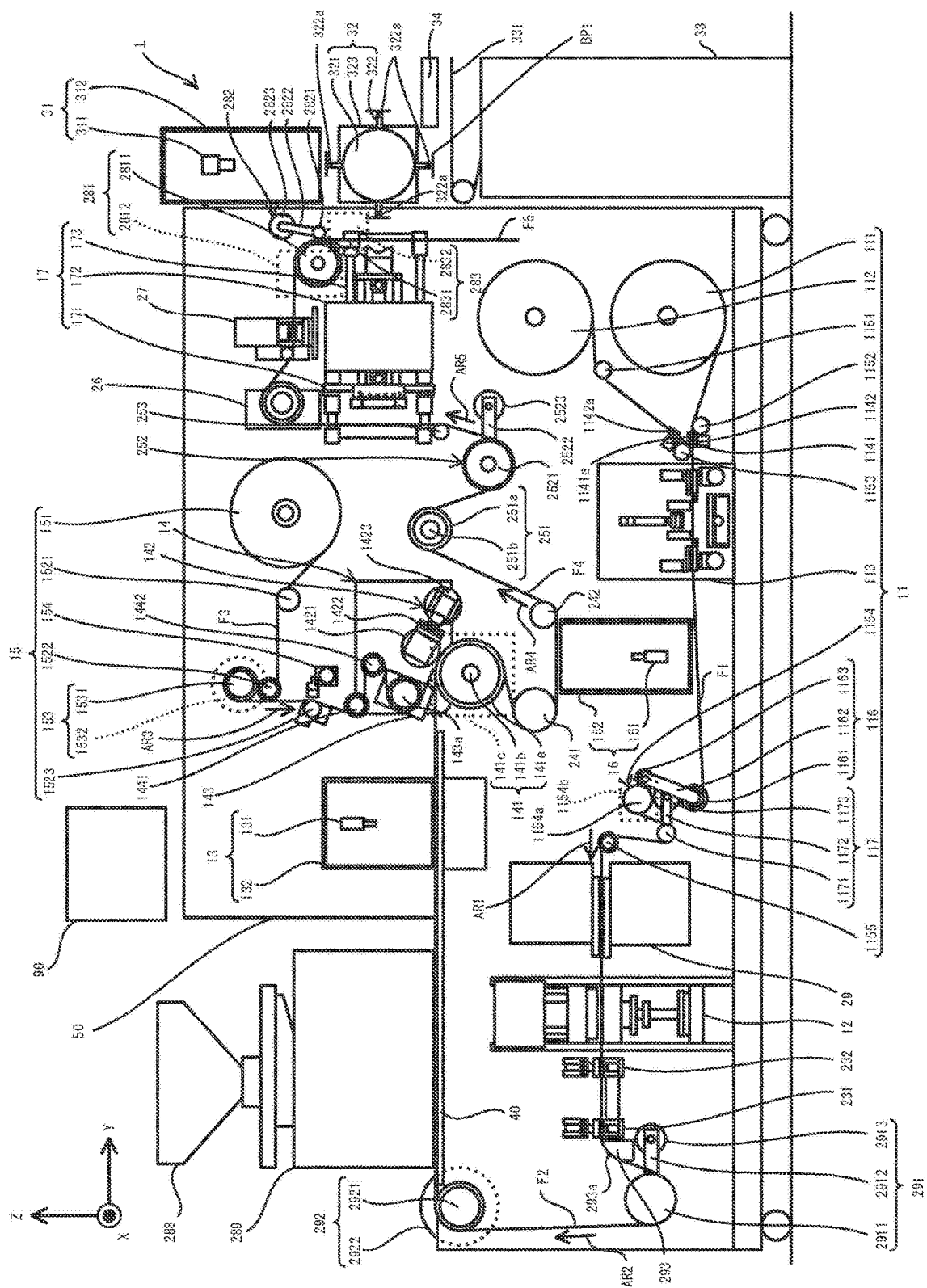
FIG. 1 is a schematic front view of a packaging machine according to an embodiment of the present disclosure.

As illustrated in FIG. 1, a packaging machine 1 according to the present embodiment includes a raw material film feeding unit 11, a heating device 29, a molding device 12, appearance inspection devices 13, 16, 31, a cover film feeding unit 15, a sealing device 14, a slit forming/punching unit 17, and a rotary suction 32. In this case, the sealing device 14 includes a container film F2, and a conveyor 141 that continuously conveys a cover film F3 and a pack film F4 downstream. The packaging machine 1 includes a chuck feed 232 that conveys a raw material film F1 and the container film F2, a fixed chuck 231, a guide roller 251 that guides the pack film F4, and a conveyor 281 that intermittently conveys the pack film F4 downstream. Furthermore, the packaging machine 1 includes a slide guide 293 that restricts position shift of the container film F2 in a width direction thereof, a tension applier 291 that applies tension to the container film F2, a tension adjuster 292, and a tension applier 252 that applies tension to the pack film F4. Additionally, the packaging machine 1 includes a film position changer 26 for correcting position shift of the pack film F4 in a hereinafter described slit forming device 171 of the slit forming/punching unit 17, a printing device 27 that prints a mark on the pack film F4, and a collection unit (not illustrated in the drawings) that collects scraps discharged from the slit forming/punching unit 17. In this case, the collection unit has a function of cutting, into strips, the pack film F4 from which a packaging pack BP has been punched, and collecting the strips. Furthermore, the packaging machine 1 includes a collection unit 34 that collects so-called defective articles of packaging packs such as packaging packs that have shape defects or packaging packs in which the workpiece is not packaged, which are discharged from the rotary suction 32, and a pack conveying device 33 that includes a belt conveyor 331 that receives packaging packs from the rotary suction 32 and conveys the received packaging packs to another device.

Additionally, the packaging machine 1 includes a stage 40 that supports the container film F2 in a state in which the workpiece can be fed to the pockets of the container film F2, and a workpiece feeding device 289 that inserts workpieces placed in a hopper 288 into the pockets of the container film F2. In this case, the workpiece feeding device 289 places a workpiece in each pocket of the container film F2 while the container film F2 is disposed above the stage 40. Note that the workpiece feeding device 289 may be omitted. In such a case, it is sufficient that a worker, that carries out the work of feeding the workpiece to the pockets of the container film F2, places one workpiece into each pocket while the container film F2 is disposed above the stage 40.

Furthermore, the packaging machine 1 includes rollers 241, 242, 253 that guide the pack film F4 discharged from the sealing device 14, and a control device 90 that controls the various devices of the packaging machine 1. Note that, in FIG. 1, in order to clarify the drawing, the control device 90 is illustrated outside a packaging machine main body 50 but, in reality, is installed on a back surface side of the packaging machine main body 50. Moreover, the packaging machine 1 includes the packaging machine main body 50 that accommodates the raw material film feeding unit 11, the molding device 12, the appearance inspection devices 13, 16, 31, the cover film feeding unit 15, the sealing device 14, the slit forming/punching unit 17, and the like.

In the packaging machine 1, as illustrated by arrow AR1, the raw material film F1 fed from the raw material film feeding unit 11 is conveyed, by the chuck feed 232, to the heating device 29 and the molding device 12. Then, as illustrated by arrow AR2, the container film F2 produced in the molding device 12 from the raw material film F1 is conveyed by the conveyor 141 of the sealing device 14 through above the stage 40 to the appearance inspection device 13 and the sealing device 15. Meanwhile, as illustrated by arrow AR3, the cover film F3 fed from the cover film feeding unit 15 is conveyed to the sealing device 14 by the conveyor 141 of the sealing device 14. Then, the sealing device 14 affixes the cover film F3 to the container film F2 and, as a result, the pack film F4 is produced. Additionally, as illustrated by arrow AR4, the pack film F4 produced by the sealing device 14 is conveyed downstream by the conveyor 141. Meanwhile, as illustrated by arrow AR5, the pack film F4 that is conveyed downstream from the sealing device 14 is intermittently conveyed, by the conveyor 281, to the slit forming/punching unit 17. Then, scrap F5 discharged from the slit forming/punching unit 17 is conveyed to the collection unit.

The raw material film feeding unit 11 feeds the belt-like raw material film F1 that is molded into the container film F2. The raw material film feeding unit 11 includes reels 111, 112 on which the raw material film F1 is wound, and an automatic film adhering device 113. Additionally, the raw material film feeding unit 11 includes rollers 1151, 1152, 1153 that guide, to the automatic film adhering device 113, the raw material film F1 fed from the reels 111, 112, and holding mechanisms 1141, 1142 that hold the raw material film F1. In this case, the holding mechanisms 1141, 1142 respectively have chucks 1141a, 1142a that hold an end, of the raw material film F1 fed from the reels 111, 112, that is made to stand-by without being fed to the molding device 12. Furthermore, the raw material film feeding unit 11 includes a conveyor 1154 that conveys the raw material film F1, a film pressing mechanism 116, a bufferer 117 for causing the feeding downstream of the raw material film F1 to continue during a period in which the feeding of the raw material film F1 from the automatic film adhering device 113 is stopped, and a roller 1155 that guides the raw material film F1 fed from the bufferer 117 to the heating device 29. The conveyor 1154 includes a roller 1154a, and a roller driver 1154b that drives the roller 1154a. Examples of the raw material film F1 include so-called soft films, specifically plastic films such as polyvinyl chloride films that have a thickness of 0.1 mm or less, so-called hard films, specifically plastic films such as polyvinyl chloride films that have a thickness greater than 0.1 mm, metal films such as aluminum films, composite films such as gas barrier films, and the like.

When the automatic film adhering device 113 detects that the raw material film F1 fed from one of the reels 111, 112 has run out, the automatic film adhering device 113 adheres a leading end portion of the raw material film F1 fed from the other of the reels 111, 112 to the terminating end portion of the raw material film F1 fed from the one of the reels 111, 112. The automatic film adhering device 113 stops the feeding of the raw material film F1 downstream for the period in which the adhering of the raw material film F1 fed from the other of the reels 111, 112 to the raw material film F1 fed from the one of the reels 111, 112 is executed.

The film pressing mechanism 116 includes a roller 1161 that contacts the raw material film F1 from vertically above, a roller 1163, and an elongated arm 1162. A first end in the longitudinal direction of the arm 1162 is pivotally supported by a shaft (not illustrated in the drawings) that penetrates the center of roller 1161, and the roller 1163 is rotatably mounted on a second end of the arm 1162. Moreover, with the arm 1162, the second end can swivel with the first end as a base point. The bufferer 117 contacts, from vertically above, a portion, between the rollers 1154a, 1155, of the raw material film F1 stretched between the rollers 1154a, 1155, and presses the portion vertically downward to apply tension to the raw material film F1. The bufferer 117 includes a roller 1171 that contacts the raw material film F1 from vertically above, and an elongated arm 1172. The roller 1171 is attached to a first end in the longitudinal direction of the arm 1172. Additionally, the bufferer 117 includes a supporter 1173 that supports the arm 1172 at a second end in the longitudinal direction of the arm 1172 such that the first end of the arm 1172 can swivel with the second end as a base point. Moreover, the film pressing mechanism 116 includes urging means (not illustrated in the drawing) that urge the second end of the arm 1162 in a direction of pressing against the roller 1154a, and the raw material film F1 is pressed against the roller 1154a by the roller 1163 that is mounted on the second end of the arm 1162. Additionally, during the period in which the feeding of the raw material film F1 from the automatic film adhering device 113 is stopped, the bufferer 117 continues the downstream feeding of the raw material film F1 by swiveling the first end of the arm 1162 in a direction approaching the automatic film adhering device 113 side.

Figure 2:
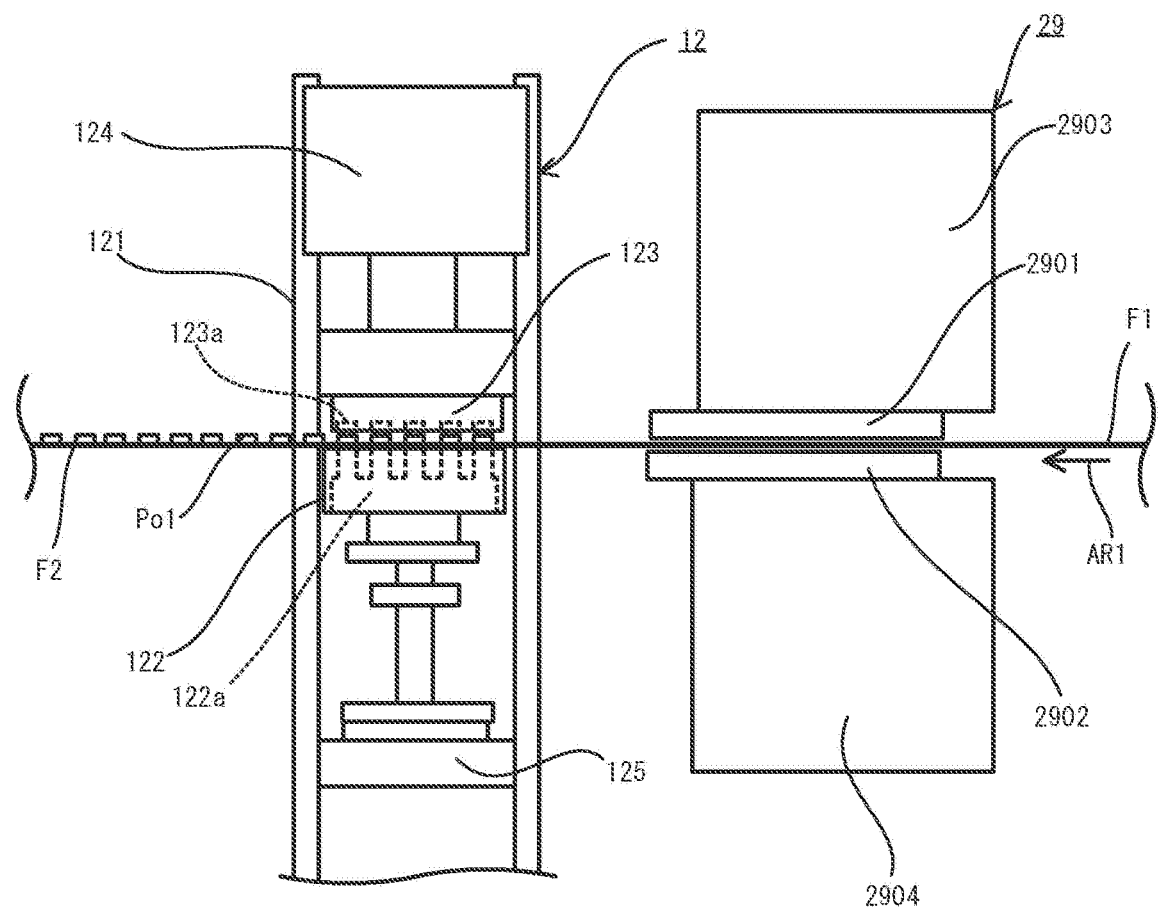
FIG. 2 is a schematic configuration drawing of a heating device and a molding device according to the embodiment.

As illustrated in FIG. 2, for example, the heating device 29 includes heat transfer plates 2901, 2902 that are respectively disposed facing both sides in a thickness direction of the raw material film F1 and in which heaters (not illustrated in the drawings) are installed, and driving units 2903, 2904 that support the heat transfer plates 2901, 2902 and that drive the heat transfer plates 2901, 2902 in the vertical direction. In one example, the heat transfer plates 2901, 2902 are formed from a metal that has high thermal conductivity. The molding device 12 forms a pocket Po1 in the raw material film F1 to produce the belt-like container film F2. The molding device 12 includes a first mold 123 disposed vertically above the raw material film F1, and a second mold 122 disposed vertically below the raw material film F1. A plug 122a that has an outer shape slightly smaller than an inside shape of the pocket Po1 to be formed in the raw material film F1, and a discharge hole (not illustrated in the drawings) for discharging gas are provided on the second mold 122. In this case, the plug 122a is disposed inside the discharge hole and can protrude outside the discharge hole. Additionally, a heater (not illustrated in the drawings) for suppressing temperature decreases of the raw material film F1 is installed in the plug 122a. Note that a configuration is possible in which a heater is not installed in the plug 122a. Meanwhile, a recess 123a corresponding to the outer shape of the pocket Po1 to be formed in the raw material film F1 is provided on the first mold 123. Additionally, the molding device 12 includes a driver 124 that drives the first mold 123 in the vertical direction, a driver 125 that drives the plug 122a in the vertical direction, a gas feeder (not illustrated in the drawings) that feeds a gas, and a device main body 121 that supports the drivers 124, 125 and the gas feeder. In one example, the gas feeder is connected to a compressor (not illustrated in the drawings) provided in the factory in which the molding device 12 is installed, and feeds a gas to the discharge hole of the second mold 122. The first mold 123 and the second mold 122 may be appropriately modified in accordance with the depth and the area of the opening portion of the pocket Po1 of the container film F2 to be produced.

The molding device 12 moves the first mold 123 vertically downward while the raw material film F1 is disposed in the molding device 12 and, as a result the raw material film F1 is pressed against the second mold 122 by the first mold 123. Due to this, the outer periphery of the pocket Po1 of the raw material film F1 is clamped by the first mold 123 and the second mold 122. Then, the molding device 12 causes the plug 122a of the first mold 123 to protrude vertically upward a protruding amount corresponding to the depth of the pocket Po1 to be produced, thereby stretching the raw material film F1. Note that the protruding amount of the plug at this time may be appropriately adjusted in accordance with the desired thickness distribution of the pocket Po1 to be produced. Then, the molding device 12 discharges the gas from the discharge hole while the plug 122a is protruding vertically upward, thereby producing the container film F2 that has the pocket Po1.

Figure 3A:
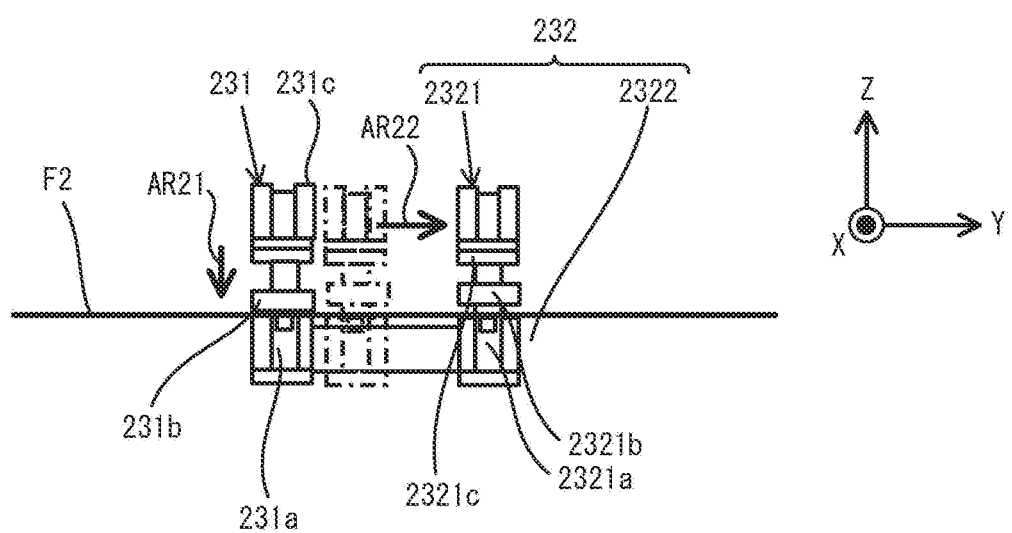
FIG. 3A is a drawing illustrating a state in which a container film is clamped by a fixed chuck according to the embodiment.

As illustrated in FIG. 3A, the fixed chuck 231 includes a supporter 231a that supports the container film F2 from vertically below, a clamp 231b that, with the supporter 231a, clamps the container film F2 from vertically above the container film F2, and a driver 231c that drives the clamp 231b in the vertical direction. The chuck feed 232 is a second conveyor that includes a chuck 2321 that clamps the container film F2, and a chuck movement mechanism 2322 that moves the chuck 2321 along a feed direction of the container film F2. The chuck 2321 includes a supporter 2321a that supports the container film F2 from vertically below, a clamp 2321b that, with the supporter 2321a, clamps the container film F2 from vertically above the container film F2, and a driver 2321c that drives the clamp 2321b in the vertical direction. Note that the chuck feed 232 may clamp a portion throughout the entire width direction of the container film F2, or may clamp both ends in the width direction of the container film F2. Alternatively, the chuck feed 232 may clamp a portion in the width direction of the container film F2.

Figure 3B:
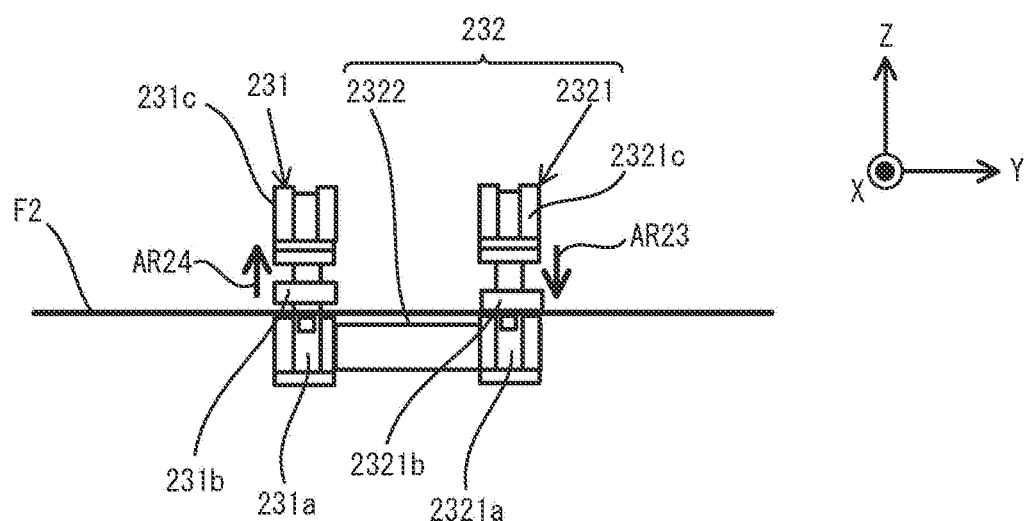
FIG. 3B is a drawing illustrating a state in which the container film is clamped by a chuck feed according to the embodiment.
Figure 3C:
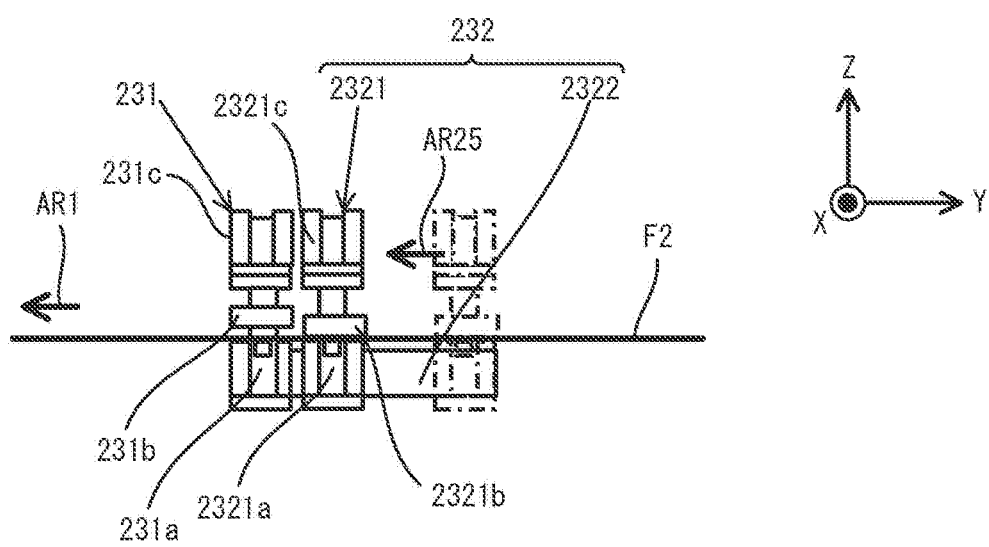
FIG. 3C is a drawing illustrating a situation in which the container film is conveyed by the chuck feed.

Next, the operations of the chuck feed 232 are described. Firstly, when the molding device 12 clamps the raw material film F1 by the first mold 123 and the second mold 122, the fixed chuck 231 clamps the container film F2 as illustrated by arrow AR21 of FIG. 3A. At this time, the chuck 2321 of the chuck feed 232 moves upstream of the container film F2 as illustrated by arrow AR22 of FIG. 3A. Next, before the molding device 12 separates the first mold 123 from the second mold 122, the chuck 2321 of the chuck feed 232 clamps the container film F2 as illustrated by arrow AR23 of FIG. 3B. Next, the fixed chuck 231 releases the clamping of the container film F2 as illustrated by arrow AR24 of FIG. 3B. Then, the chuck movement mechanism 2322 of the chuck feed 232 moves the chuck 2321 downstream as illustrated by arrow AR25 of FIG. 3C. As a result, the container film F2 is conveyed downstream, as illustrated by arrow AR1 of FIG. 3C. The fixed chuck 231 again clamps the container film F2, and the chuck 2321 of the chuck feed 232 releases the clamping of the container film F2. Then, the chuck movement mechanism 2322 moves the chuck 2321 upstream of the container film F2, that is, in the direction approaching the fixed chuck 231. Thereafter, the chuck feed 232 repeats the series of operations described above, thereby intermittently conveying the container film F2 downstream.

The slide guide 293 includes a curved surface 293a that slide-contacts the container film F2, and slidably supports the container film F2. At least the portion of the slide guide 293 including the curved surface 293a is formed from a resin material such as polytetrafluoroethylene, polyethylene, polyacetal, or the like, or a metal such as stainless steel. From the perspective of suppressing deformation of the pocket Po1 of the container film F2, a curvature radius of the curved surface 293a is preferably longer than at least the length of the pocket Po1 in the conveyance direction of the container film F2. Note that it is preferable that the curvature radius is longer than the length of the container film F2 in the width direction. The tension applier 291 applies tension to the container film F2 by contacting the portion, between the slide guide 293 and the tension adjuster 292, of the container film F2 stretched between the slide guide 293 and the tension adjuster 292, and pressing the portion vertically downward.

The tension applier 291 includes a roller 2911 that contacts the container film F2, and an elongated arm 2912. The roller 2911 is rotatably attached to a first end in the longitudinal direction of the arm 2912. Additionally, the tension applier 291 includes a supporter 2913 that supports the arm 2912 at a second end in the longitudinal direction of the arm 2912 such that the first end of the arm 2912 can swivel with the second end as a base point. The tension adjuster 292 includes a roller 2921 on which the container film F2 is wound, and a powder clutch brake 2922 coupled to the roller 2921 via a driven member shaft (not illustrated in the drawings). The tension adjuster 292 adjusts the rotational torque of the roller 2921 by the powder clutch brake 2922 to adjust the tension applied to the container film F2 stretched between the roller 2921 and a wheel 141a of the sealing device 14.

The appearance inspection device 13 is disposed upstream of the sealing device 14. The appearance inspection device 13 includes an imager 131 that images the container film F2, and a housing 132 that accommodates the imager 131. The imager 131 is a second imager that sends, the control device 90, image information obtained by imaging the container film F2 in which the workpiece stored in the pockets. In this case, a three-dimensional scanning device, a laser scanning device, or the like can be used as the imager 131.

The cover film feeding unit 15 feeds the belt-like cover film F3. The cover film feeding unit 15 includes a reel 151 on which the cover film F3 is wound, rollers 1521, 1522, 1523 that guide, to the sealing device 14, the cover film F3 fed from the reel 151, a tension adjuster 153, and a position sensor 154. Examples of the cover film F3 include metal films such as aluminum films, composite films such as gas barrier films, and the like. The tension adjuster 153 includes a roller 1531 on which the cover film F3 is wound, and a powder clutch brake 1532 coupled to the roller 1531 via a driven member shaft (not illustrated in the drawings). The tension adjuster 153 adjusts the rotational torque of the roller 1531 by the powder clutch brake 1532 to adjust the tension applied to the cover film F3 stretched between the roller 1531 and the roller 1441 of the sealing device 14. The position sensor 154 detects a mark provided on the cover film F3 to detect a position shift amount, from a preset reference position, of the cover film F3 in the conveyance direction. Then, the tension adjuster 153 adjusts the rotational torque of the roller 1531 so as to reduce the position shift amount from the reference position, on the basis of the position shift amount from the reference position detected by the position sensor 154.

The sealing device 14 seals the pocket Po1 by adhering the cover film F3 to the container film F2 in a state in which the workpiece is stored in the pocket Po1 of the container film F2. The sealing device 14 includes the conveyor 141 described above, a heater 143 that heats the cover film F3, and a presser 142 that presses the cover film F3 wound on the wheel 141a against the wheel 141a. Additionally, the sealing device 14 includes rollers 1441, 1442 that guide, to the heater 143, the cover film F3 fed from the cover film feeding unit 15. The conveyor 141 includes a cylindrical wheel 141a, a shaft 141b that axially supports the wheel 141a, and a driver 141c that rotationally drives the shaft 141b. A plurality of recesses (not illustrated in the drawings) for hanging the pockets of the container film F2 are provided juxtaposed along a circumferential direction of the wheel 141a, on a circumferential surface of the wheel 141a. The driver 141c rotates the wheel 141a while the pockets of the container film F2 are hung on a portion of the plurality of recesses of the wheel 141a. As a result, a pack film F4 in which the cover film F3 is adhered to the container film F2 is continuously conveyed downstream of the sealing device 14. The heater 143 includes a heat transfer roller 143a on which the cover film F3 is wound, and heats the heat transfer roller 143a to heat the cover film F3. The heat transfer roller 143a is formed from a metal that has high thermal conductivity. Note that a configuration is possible in which a roller without a heating function is provided instead of the heater 143. The presser 142 includes a roller 1421 that press-contacts the container film F2 and the cover film F3 that are wound on the wheel 141a of the conveyor 141, and an elongated arm 1422. The roller 1421 is rotatably attached to a first end in the longitudinal direction of the arm 1422. Additionally, the presser 142 includes an arm driver 1423 that supports the arm 1422 at a second end in the longitudinal direction of the arm 1422 such that the first end of the arm 1422 can swivel with the second end as a base point, and that urges the first end of the arm 1422 in a direction of being pressed against the roller 1421. The sealing device 14 crimps the cover film F3 to the outer periphery of the container film F2 by clamping by the wheel 141a of the conveyor 141 and the roller 1421 while the heated cover film F3 is stacked on the container film F2.

The appearance inspection device 16 includes an imager 161 that images the pack film F4, and a housing 162 that accommodates the imager 161. The imager 161 sends, to the control device 90, image information obtained by imaging the pack film F4 stretched between the rollers 241, 242. In this case, the control device 90 determines, on the basis of the image information acquired from the appearance inspection device 16, the presence/absence of shape defects of portions of the pack film F4 corresponding to each packaging pack BP1, the presence/absence of debris and adhered foreign matter, the presence/absence of mixing of different articles in the pockets, or the presence/absence of workpieces in the pockets. The control device 90 outputs, on the basis of determination results and to the rotary suction 32, control information for sorting out the defective articles of the packaging pack BP1. In this case, a three-dimensional scanning device, a laser scanning device, or the like can be used as the imager 161.

The guide roller 251 includes a wheel 251a and a shaft 251b that axially supports the wheel 251a. A plurality of recesses (not illustrated in the drawings) for hanging the pockets of pack film F4 are provided juxtaposed on the wheel 141a, along a circumferential direction the wheel 141a. The tension applier 252 contacts, from vertically above, a portion, between the guide roller 251 and the roller 253, of the pack film F4 stretched between the guide roller 251 and the roller 253, and presses the portion vertically downward to apply tension to the pack film F4. The tension applier 252 includes a roller 2521 that contacts the pack film F4 from vertically above, and an elongated arm 2522. The roller 2521 is attached to a first end in the longitudinal direction of the arm 2522. Additionally, the tension applier 252 includes a supporter 2523 that supports the arm 2522 at a second end in the longitudinal direction of the arm 2522 such that the first end of the arm 2522 can swivel with the second end as a base point.

Figure 4:
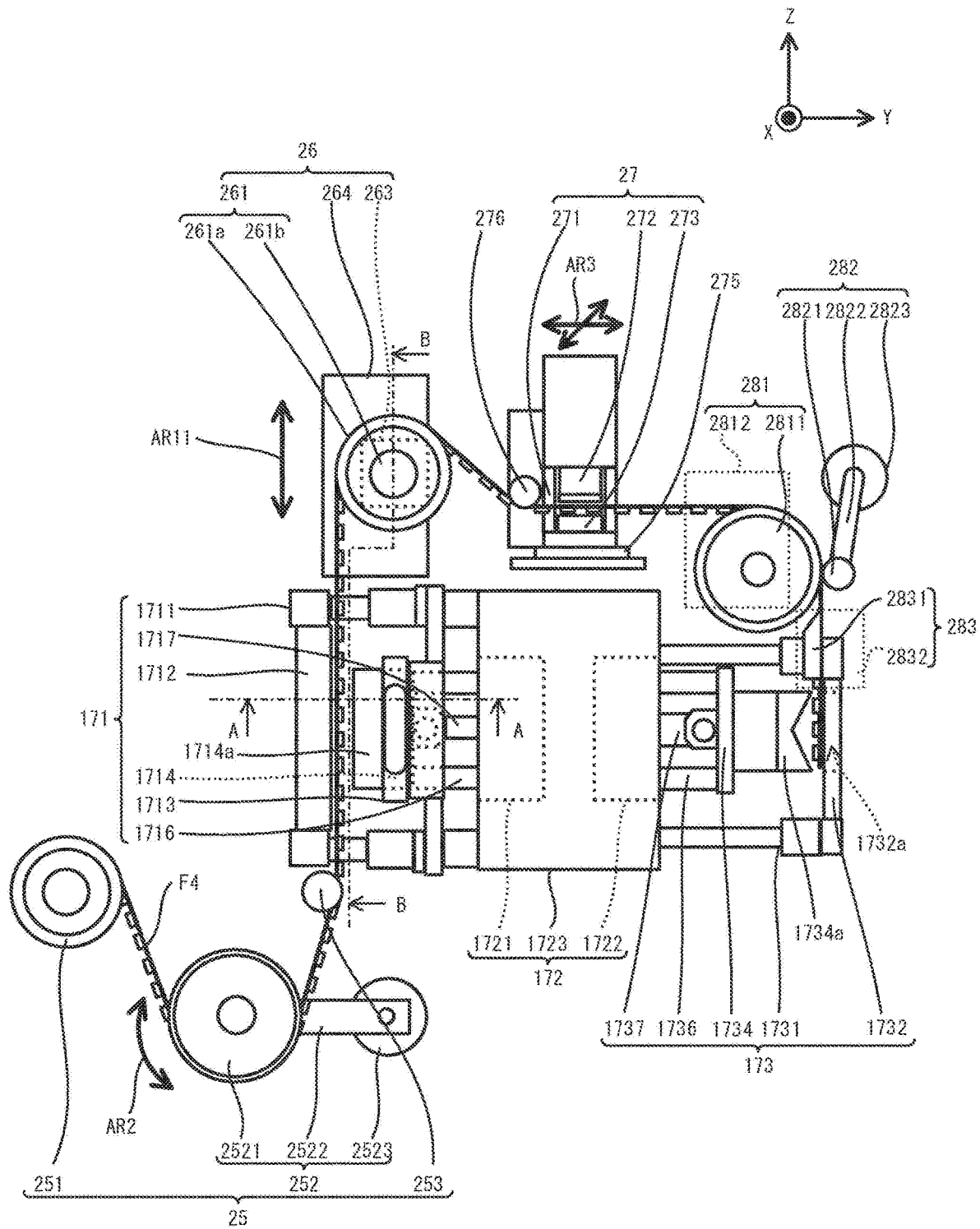
FIG. 4 is a schematic configuration drawing of a slit forming device, a printing device, and a punching device according to the embodiment.
Figure 5A:
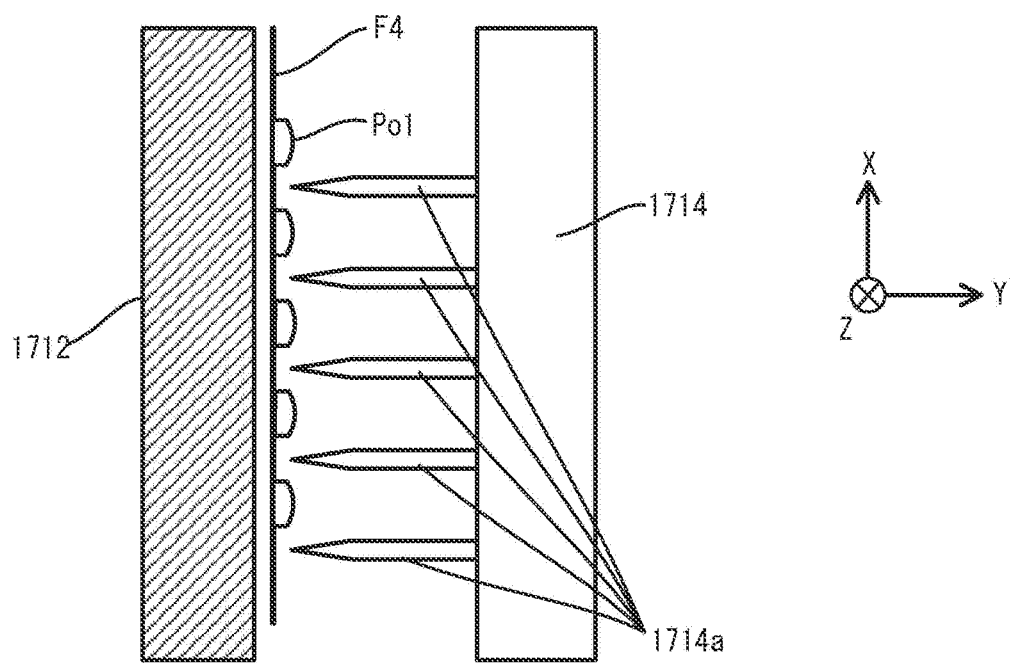
FIG. 5A is an enlarged view of a portion of the slit forming device according to the embodiment.

The slit forming/punching unit 17 includes a slit forming device 171, a punching device 173, and a driver 172 on which the slit forming device 171 is fixed on a −Y direction side and the punching device 173 is fixed on a +Y direction side. As illustrated in FIG. 4, the slit forming device 171 includes a die unit 1712 disposed on the −Y direction side of the pack film F4, and a head 1714 disposed on the +Y direction side of the pack film F4. Cutters 1714a for producing slits in the pack film F4 are provided on the head 1714. As illustrated in FIG. 5, the cutters 1714a are disposed facing a plurality (five in FIG. 5A) of locations of the pack film F4 at which slits are to be produced. Returning to FIG. 4, a guide rod 1716 and a power transfer arm 1717 extending in the −Y direction from the driver 172 are connected to the head 1714. Furthermore, the slit forming device 171 includes a head supporter 1713 that has a frame shape and that supports, on an inner side thereof, the head 1714 so as to be capable of sliding in the Y-axis direction, and a main body 1711 that is fixed to the driver 172 and that collectively supports the die unit 1712 and the head supporter 1713. A heater (not illustrated in the drawings) for heating the cutters 1714a is provided on the head supporter 1713.

The punching device 173 punches the pack film F4 when the pack film F4 that is conveyed intermittently by the conveyor 281 is stopped. The punching device 173 includes a die unit 1732 disposed on the +Y direction side of the pack film F4, and a head 1734 disposed on the −Y direction side of the pack film F4. A cutter 1734a for punching the packaging pack BP1 from the pack film F4 is provided on the head 1734. A guide rod 1736 and a power transfer arm 1737 extending in the +Y direction from the driver 172 are connected to the head 1734. An opening 1732a, for discharging the packaging pack BP1 punched from the pack film F4 to the +Y direction side of the die unit 1732, is formed in the die unit 1732. Furthermore, the punching device 173 includes a main body 1731 that is fixed to the driver 172 and that supports the die unit 1732. The driver 172 includes a slit forming device driver 1721 that moves the power transfer arm 1717 along the Y-axis direction, a punching device driver 1722 for moving the power transfer arm 1737 along the Y-axis direction, and a housing 1723 that accommodates these components.

The printing device 27 includes a print head 272 that prints a predetermined mark on the pack film F4 when the pack film F4 that is conveyed intermittently by the conveyor 281 is stopped, and a die unit 273. The printing device 27 stamps the mark on the pack film F4 by pressing the print head 272 toward the die unit 1712 while a portion of the pack film F4 where the mark is to be formed is interposed between the print head 272 and the die unit 273. Additionally, the printing device 27 includes a supporter 271 that supports the print head 272 and the die unit 273, a supporter driver 275 that moves the supporter 271 relative to the pack film F4, and a roller 276 that guides the pack film F4 between the print head 272 and the die unit 273. The position of this roller 276 is fixed. The supporter driver 275 moves the supporter 271 in the conveyance direction or the width direction of the pack film F4 to change the position of the mark to be printed on the pack film F4 by the print head 272.

Figure 5B:
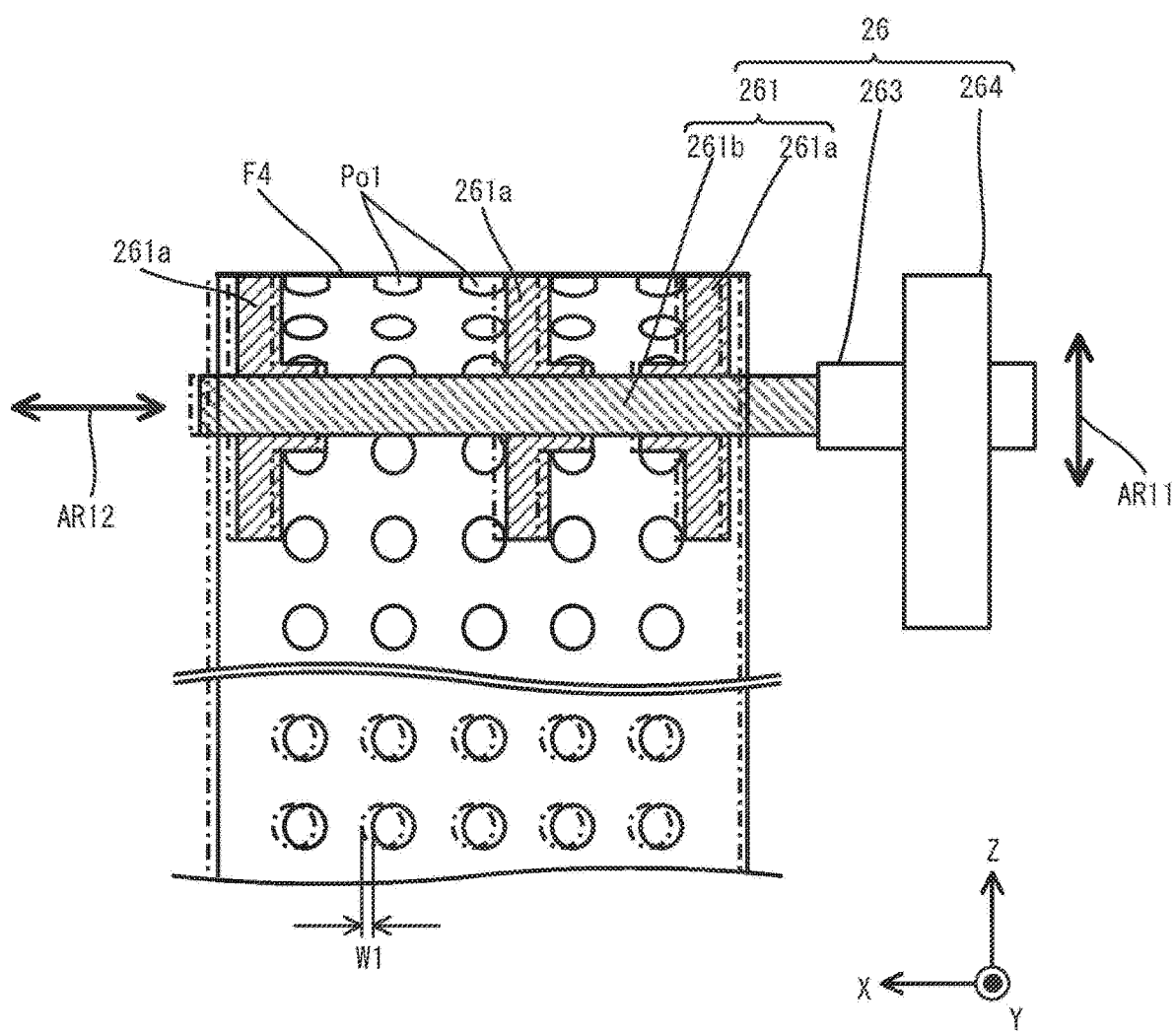
FIG. 5B is an operation explanation drawing of the slit forming device according to the embodiment.

As illustrated in FIG. 5B, the film position changer 26 is a second film position changer that includes a guide roller 261 that guides the pack film F4 to be fed to the slit forming device 171, a roller supporter 263 that rotatably supports the guide roller 261, and a guide driver 264. The guide roller 261 is a first guide roller that includes three wheels 261a, and a shaft 261b that axially supports the three wheels 261a. The guide driver 264 moves, via the roller supporter 263, the guide roller 261 in the width direction of the pack film F4, that is, in the X-axis direction (see arrow AR12 of FIG. 5B), and in a direction along the conveyance direction of the pack film F4, that is, in the Z-axis direction (see arrow AR11 of FIG. 5B). In one example, as illustrated by the dot-dash line of FIG. 5B, the guide driver 264 changes the position of the wheels 261a to a position shifted a distance W1 to the +X direction side to change the position in the X-axis direction of the pack film F4 in the slit forming device 171 to a position shifted the distance W1 to the +X direction side.

Figure 6:
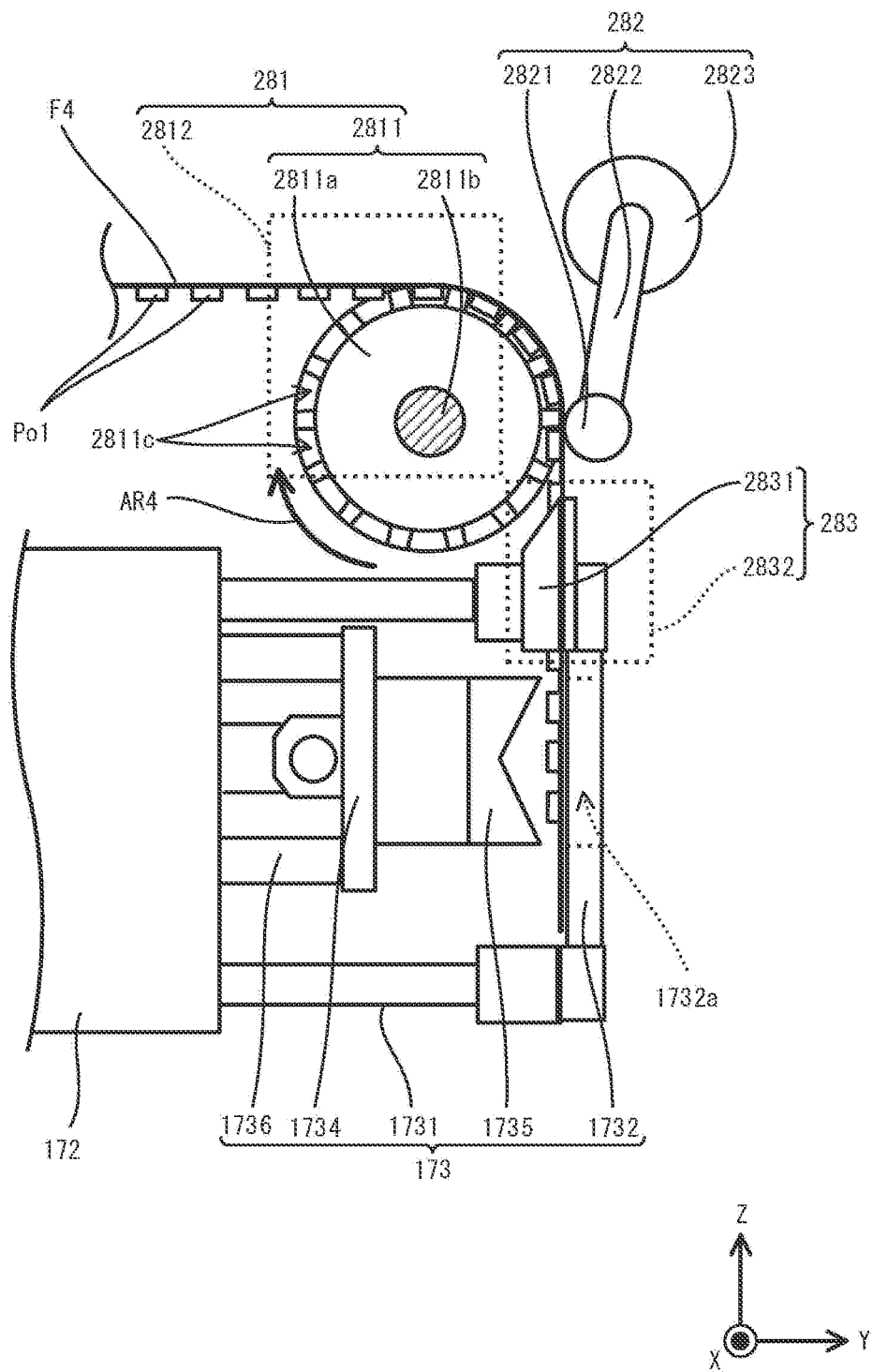
FIG. 6 is a schematic configuration drawing of a conveyor according to the embodiment.

The conveyor 281 is a first conveyor that includes a film feeding roller 2811 on which the pack film F4 is wound, and a roller driver 2812. As illustrated in FIG. 6, the film feeding roller 2811 includes a wheel 2811a and a shaft 2811b that axially supports the wheel 2811a. A plurality of recesses 2811c for hanging the pockets Po1 of pack film F4 are provided juxtaposed on the wheel 2811a, along a circumferential direction of the wheel 2811a. The conveyor 281 continuously conveys the pack film F4 downstream by rotating the film feeding roller 2811 while the pockets of the pack film F4 are hung on a portion of the plurality of recesses of the film feeding roller 2811. The roller driver 2812 intermittently rotates, via the shaft 2811b, the film feeding roller 2811 one predetermined rotation angle at a time in the direction illustrated by the arrow AR4 of FIG. 6, while the pockets Po1 of the pack film F4 are hung on a portion of the plurality of recesses 2811c of the wheel 2811a. As a result, the pack film F4 is intermittently fed to the punching device 173 one predetermined first reference distance at a time. In this case, the first reference distance is set so as to be equal to the length, in the longitudinal direction of the pack film F4, of a portion corresponding to one packaging pack. A film presser 282, for preventing the pack film F4 from falling off the film feeding roller 2811 during conveyance of the pack film F4, is disposed on the +Y direction side of the conveyor 281. The film presser 282 includes a roller 2821 that contacts, from the +Y direction side of the film feeding roller 2811, the pack film F4 wound on the film feeding roller 2811, and an elongated arm 2822. The roller 2821 is attached to a first end in the longitudinal direction of the arm 2822. Additionally, the film presser 282 includes an arm driver 2833 that rotatably supports a second end in the longitudinal direction of the arm 2822, and that urges the first end of the arm 2822 in a direction of being pressed against the roller 2821.

Figure 7A:
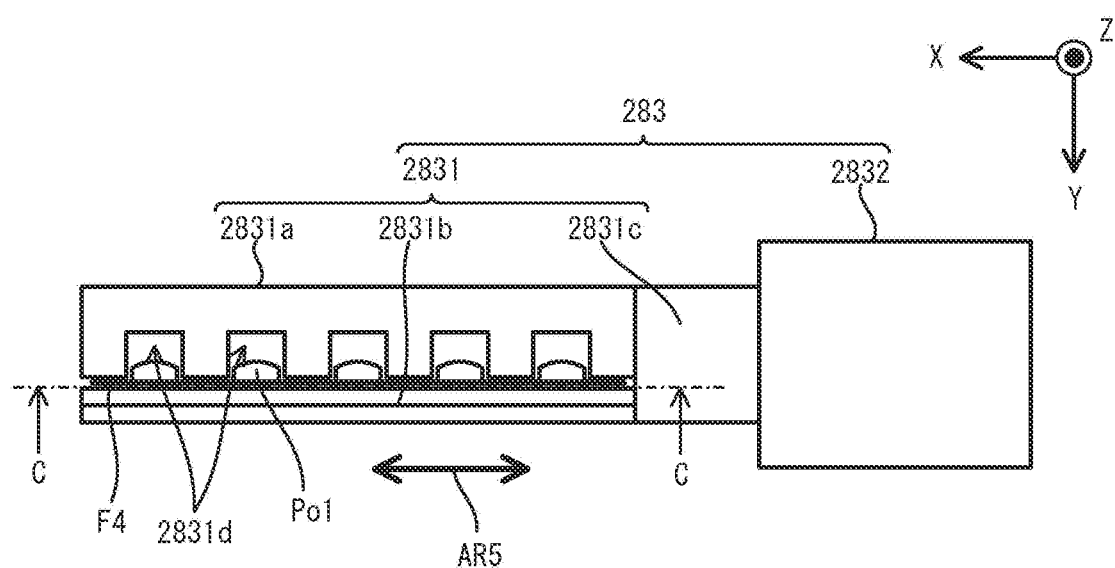
FIG. 7A is an operation explanation drawing of a first film position changer according to the embodiment.
Figure 7B:
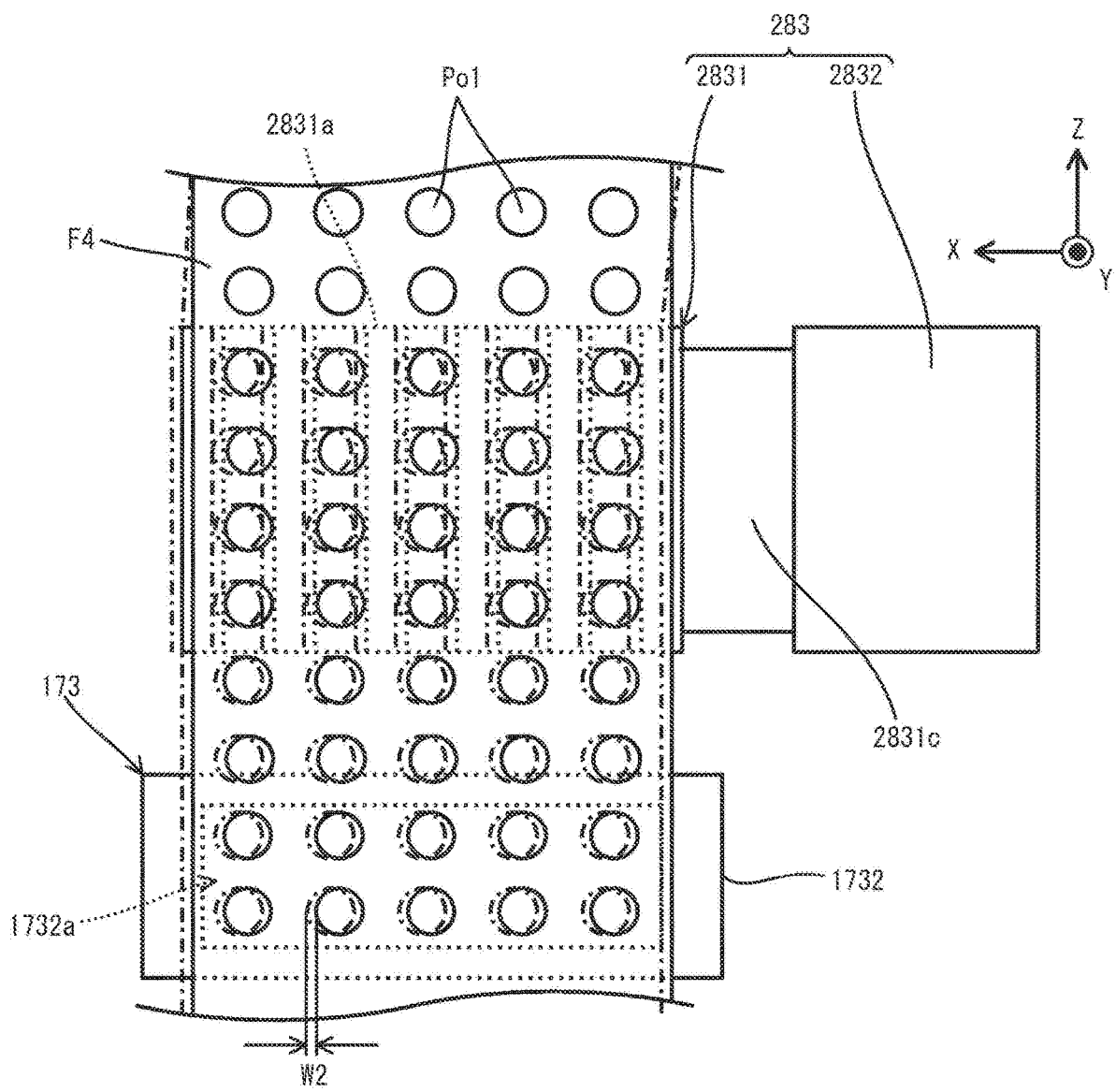
FIG. 7B is an operation explanation drawing of the first film position changer according to the embodiment, viewed from another direction.

The film position changer 283 is a first film position changer that includes a film guide 2831 that is disposed downstream of the conveyor 281 and that guides the pack film F4, and a guide driver 2832 that drives the film guide 2831 in the width direction, that is, along the X-axis direction, of the pack film F4. As illustrated in FIG. 7A, the film guide 2831 is a guider that includes a guide main body 2831a that is disposed facing a first surface side of the pack film F4 in a thickness direction. Grooves 2831d are formed on the surface of the pack film F4 side of the guide main body 2831a. Additionally, the film guide 2831 includes an auxiliary plate 2831b disposed facing a second surface side of the pack film F4 in the thickness direction, and a support member 2831c that collectively supports the guide main body 2831a and the auxiliary plate 2831b. The guide driver 2832 changes the position of the film guide 2831 in the X-axis direction by driving, via the support member 2831c, the film guide 2831 along the X-axis direction as illustrated by arrow AR5 of FIG. 7A. In one example, as illustrated by the dot-dash line of FIG. 7B, the guide driver 2832 changes the position of the film guide 2831 to a position shifted a distance W2 to the +X direction side to change the position in the X-axis direction of the pack film F4 in the punching device 173 to a position shifted the distance W2 to the +X direction side.

Returning to FIG. 1, the rotary suction 32 is a packaging pack holding device that includes a shaft 321, and four arms 322. First ends of the arms 322 are fixed to the shaft 321, and chuck units 322a that hold the packaging pack BP1 are provided on second ends of the arms 322. A unit that includes a vacuum chuck, an electrostatic chuck, or the like is used as the chuck unit 322a. Additionally, the rotary suction 32 includes a shaft driver 323 that rotates the shaft 321. The shaft driver 323 rotates the shaft 321 to dispose each chuck unit 322a at a receiving position for receiving a packaging pack BP1 from the punching device 173, and at an imaging position for imaging, by an imager 311 of an appearance inspection device 31 (described later), the packaging pack BP1 held by each chuck unit 322a. Additionally, the shaft driver 323 further rotates the shaft 321 to dispose each chuck unit 322a at a collection position for discharging, to the collection unit 34, the defective article of the packaging pack BP1 held by the chuck unit 322a, and at a transfer position for transferring the packaging pack BP1 held by the chuck unit 322a to the pack conveying device 33. In this case, on the basis of control information input from the control device 90, the shaft driver 323 disposes the packaging pack BP1 determined to be a defective article at the collection position and, then, releases the holding by the chuck unit 322a to discharge that packaging pack BP1 to the collection unit 34.

The appearance inspection device 31 includes an imager 311, and a housing 312 that accommodates the imager 311. The imager 311 is a first imager that sends, to the control device 90, image information obtained by imaging the packaging pack BP1 disposed at the imaging position described above while being held by the chuck unit 322a of the rotary suction 32. In this case, a three-dimensional scanning device, a laser scanning device, or the like can be used as the imager 311.

The pack conveying device 33 includes a belt conveyor 331, and a driver (not illustrated in the drawings) that drives the belt conveyor 331.

As illustrated in FIG. 8, the control device 90 includes a central processing unit (CPU) 901, a main storage 902, an auxiliary storage 903, an input interface 904, an output interface 905, and a bus 909 that connects the various components. The main storage 902 is a random-access memory (RAM), and is used as the working area of the CPU 901. The auxiliary storage 903 is configured from non-volatile memory such as semiconductor memory, and stores a program for realizing the various functions of the control device 90. The input interface 904 is connected to each of the imager 131 of the appearance inspection device 13, the imager 161 of the appearance inspection device 16, and the imager 311 of the appearance inspection device 31 and outputs, to the CPU 901 via the bus 909, the image information sent from each of the imagers 131, 161, 311. The output interface 905 is connected to the chuck feed 232, the roller driver 2812, the guide drivers 264, 2832, and the supporter driver 275 and, on the basis of control information input from the CPU 901, outputs control signals for controlling the operations of the chuck feed 232, the roller driver 2812, the guide drivers 264, 2832, and the supporter driver 275 to each of the chuck feed 232, the roller driver 2812, the guide drivers 264, 2832, and the supporter driver 275.

In the control device 90, the CPU 901 reads the program stored in the auxiliary storage 903 into the main storage 902 and executes the program to function as a container film image acquirer 911, a packaging pack image acquirer 912, a container film pocket position calculator 913, a packaging pack pocket position calculator 914, a mark position calculator 915, a position shift amount calculator 916, a determiner 917, a pocket molding position correction amount calculator 918, a punching position correction amount calculator 919, a slit position correction amount calculator 920, a mark position correction amount calculator 921, a chuck feed controller 922, a conveyance controller 923, a film guide position controller 924, a printing controller 925, and a slit position controller 926. Note that a configuration is possible in which the various functional components realized by the control device 90 are configured from a plurality of control devices. For example, two separate control devices may be provided, namely a control device that functions as the container film image acquirer 911, the packaging pack image acquirer 912, the container film pocket position calculator 913, the packaging pack pocket position calculator 914, the mark position calculator 915, the position shift amount calculator 916, the determiner 917, the pocket molding position correction amount calculator 918, the punching position correction amount calculator 919, the slit position correction amount calculator 920, and the mark position correction amount calculator 921, and a control device that functions as the chuck feed controller 922, the conveyance controller 923, the film guide position controller 924, the printing controller 925, and the slit position controller 926. The auxiliary storage 903 includes a regular dimension storage 931 that stores regular dimension information expressing regular dimensions of each predetermined portion of the packaging pack BP1, and a determination criteria storage 932 that stores pass/fail determination criteria information that serves as a reference for determining passing articles and defective articles of the packaging pack BP1. Additionally, the determination criteria storage 932 stores information expressing a correction execution threshold for each of a position shift amount of the punching position by the punching device 173, a position shift amount of the slit forming position by the slit forming device 171, a position shift amount of the mark printed by the printing device 27, and a position shift amount of the pocket molding position formed by the molding device 12. The correction execution threshold is for determining, on the basis of the magnitude of each position shift amount, whether to execute correction of the punching position, the slit forming position, the position of the mark, and the pocket molding position.

The container film image acquirer 911 acquires, from the imager 131, image information expressing a container film image acquired by imaging the container film F2 by the imager 131 of the appearance inspection device 13. The packaging pack image acquirer 912 acquires, from the imager 311, image information expressing a packaging pack image obtained by imaging, by the imager 311 of the appearance inspection device 31, the packaging pack BP1 held by the rotary suction 32.

Figure 9:
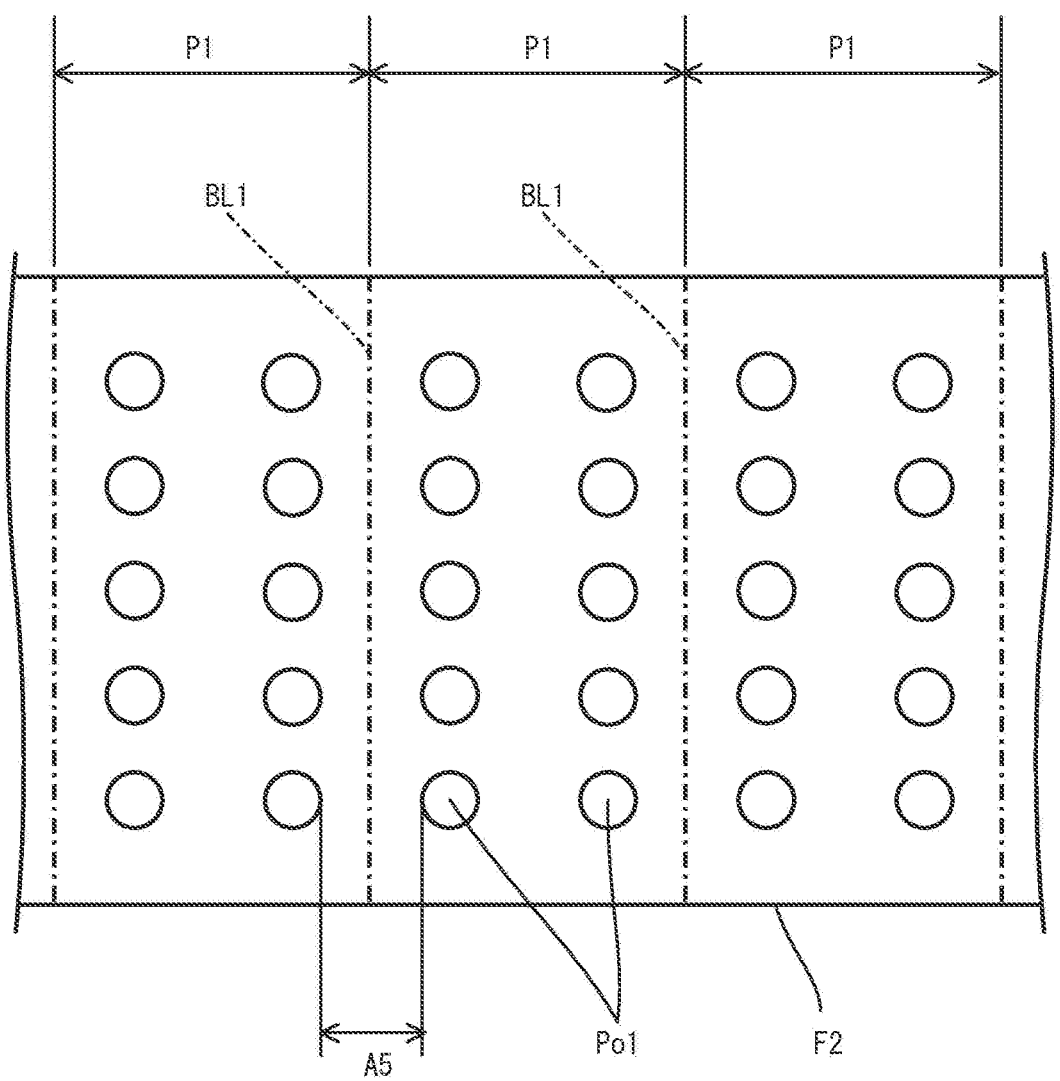
FIG. 9 is an operation explanation drawing of the packaging machine according to the embodiment.

The container film pocket position calculator 913 calculates a distance that reflects the relative position of the pocket Po1 with respect to the container film F2. Specifically, as, for example, illustrated in FIG. 9, the container film pocket position calculator 913 calculates, for a plurality of regions P1 juxtaposed along the longitudinal direction of the container film F2, a shortest distance A5 between peripheries of the pockets Po1 closest to a boundary portion BL1 of two adjacent regions P1. In this case, each of the plurality of regions P1 corresponds to a portion corresponding to one packaging pack BP1.

The packaging pack pocket position calculator 914 calculates distances that reflect the relative position of the pocket Po1 with respect to the packaging pack BP1 and to slits SL1, SL2 formed in the packaging pack BP1. Specifically, as, for example, illustrated in FIG. 10, the packaging pack pocket position calculator 914 calculates a shortest distance A1 between one edge of the packaging pack BP1 in a lateral direction and the periphery of the pocket Po1 closest to that one edge. Additionally, the packaging pack pocket position calculator 914 calculates a shortest distance A2 between the other edge of the packaging pack BP1 in the lateral direction and the periphery of the pocket Po1 closest to that other edge. Furthermore, the packaging pack pocket position calculator 914 calculates a shortest distance a1 between one edge of the packaging pack BP1 in a longitudinal direction and the periphery of the pocket Po1 closest to that one edge. Moreover, the packaging pack pocket position calculator 914 calculates a shortest distance a2 between the other edge of the packaging pack BP1 in the longitudinal direction and the periphery of the pocket Po1 closest to that other edge. In this case, the lateral direction of the packaging pack BP1 corresponds to the longitudinal direction of the pack film F4, and the longitudinal direction of the packaging pack BP1 corresponds to the width direction of the pack film F4.

Additionally, the packaging pack pocket position calculator 914 calculates a shortest distance A3 between the slit SL1 formed along the longitudinal direction of the packaging pack BP1 and the periphery of one of the pockets Po1 positioned on both sides, in the lateral direction of the packaging pack BP1, of that slit SL1. Moreover, the packaging pack pocket position calculator 914 calculates shortest distances a31, a32 between the periphery of the pocket Po1 closest to one edge of the packaging pack BP1 in the longitudinal direction and each of the slits SL2 formed on both sides, in the longitudinal direction of the packaging pack BP1, of that pocket Po1. Furthermore, the packaging pack pocket position calculator 914 calculates a shortest distance a33 between the periphery of the pocket Po1 closest to the other edge of the packaging pack BP1 in the longitudinal direction and the slit SL2 formed on the other side, in the longitudinal direction of the packaging pack BP1, of that pocket Po1.

The mark position calculator 915 calculates distances that reflect the relative position of the mark, printed on the packaging pack BP1, with respect to the packaging pack BP1. As, for example, illustrated in FIG. 10, the mark position calculator 915 calculates shortest distances A41, A42 between the center of a mark MK1 in the lateral direction of the packaging pack BP1 and the periphery of each of two pockets Po1. Additionally, the mark position calculator 915 calculates a shortest distance a4 between the center of the mark MK1 in the longitudinal direction of the packaging pack BP1 and one edge of the packaging pack BP1 in the longitudinal direction.

The position shift amount calculator 916 calculates, on the basis of the packaging pack image described above, a punching position shift amount from the regular punching position and a slit position shift amount from the regular position of each of the slits SL1, SL2. Additionally, the position shift amount calculator 916 calculates, on the basis of the packaging pack image described above, a mark position shift amount of the mark MK1 described above. Furthermore, the position shift amount calculator 916 calculates, on the basis of the container film image described above, a pocket molding position shift amount of the pocket molding position of the pocket Po1. Specifically, the position shift amount calculator 916 calculates, as a position shift amount ΔAc of the punching position in the conveyance direction of the pack film F4, a difference (A1−A2) obtained by subtracting the shortest distance A2, between the other edge of the packaging pack BP1 in the lateral direction and the periphery of the pocket Po1 closest to that other edge, from the shortest distance A1 calculated by the packaging pack pocket position calculator 914 described above.

Additionally, the position shift amount calculator 916 acquires information, stored in the regular dimension storage 931, expressing a regular dimension a1$c$ of a shortest distance between one edge of the packaging pack BP1 in the longitudinal direction and the periphery of the pocket Po1 closest to that one edge, and a regular dimension a2$c$ of a shortest distance between the other edge of the packaging pack BP1 in the longitudinal direction and the periphery of the pocket Po1 closest to that other edge. Moreover, the position shift amount calculator 916 calculates, on the basis of the relational expression of Equation (1) below, a position shift amount of the punching position in the width direction of the pack film F4.

$$\Delta ac = (a1 - a1c) - (a2 - a2c) \quad (1)$$

Here, a1 represents the shortest distance, calculated by the packaging pack pocket position calculator 914 described above, between one edge of the packaging pack BP1 in the longitudinal direction and the periphery of the pocket Po1 closest to that one edge. Additionally, a2 represents the shortest distance, calculated by the packaging pack pocket position calculator 914 described above, between the other edge of the packaging pack BP1 in the longitudinal direction and the periphery of the pocket Po1 closest to that other edge. Furthermore, $\Delta ac$ represents the position shift amount of the punching position in the width direction of the pack film F4.

Additionally, the position shift amount calculator 916 acquires information, stored in the regular dimension storage 931, expressing a regular dimension A3$c$ of the shortest distance between the slit SL1 formed along the longitudinal direction of the packaging pack BP1 and the periphery of one of the pockets Po1 positioned on both sides, in the lateral direction of the packaging pack BP1, of that slit SL1. Moreover, the position shift amount calculator 916 calculates, as a position shift amount $\Delta As$ of the slit forming position in the width direction of the pack film F4, a difference (A3–A3$c$) obtained by subtracting the regular dimension A3$c$ expressed in the acquired information from the shortest distance A3 calculated by the packaging pack pocket position calculator 914 described above.

Furthermore, the position shift amount calculator 916 acquires information, stored in the regular dimension storage 931, expressing a regular dimension A31$c$ of the shortest distance between the periphery of the pocket Po1 closest to one edge of the packaging pack BP1 in the longitudinal direction and one of the slits SL2 formed on each of both sides, respectively, in the longitudinal direction of the packaging pack BP1, of that pocket Po1, and a regular dimension a33$c$ of a shortest distance between the periphery of the pocket Po1 closest to the other edge of the packaging pack BP1 in the longitudinal direction and the slit SL2 formed on the other side, in the longitudinal direction of the packaging pack BP1, of that pocket Po1. Moreover, the position shift amount calculator 916 calculates, on the basis of the relational expression of Equation (2) below, a position shift amount of the punching position in the width direction of the pack film F4.

$$\Delta as = (a31 - a33) - (a31c - a33c) \quad (2)$$

Here, a31 represents the shortest distance, calculated by the packaging pack pocket position calculator 914 described above, between the periphery of the pocket Po1 closest to the one edge of the packaging pack BP1 in the longitudinal direction and one of the slits SL2 formed on both sides, in the longitudinal direction of the packaging pack BP1, of that pocket Po1. Additionally, a33 represents the shortest distance, calculated by the packaging pack pocket position calculator 914 described above, between the periphery of the pocket Po1 and the slit SL2. Furthermore, $\Delta as$ represents the position shift amount of the slit forming position in the width direction of the pack film F4.

The spacing between pockets Po1 adjacent in the width direction of the pack film F4 may differ from the spacing between the cutters 1714$a$ of the slit forming device 171 due to heat shrinkage of the pack film F4 in the width direction. To solve this, as described above, the position shift amount calculator 916 uses the relational expression of Equation (2) to calculate the position shift amount and, thereby, can accurately calculate the position shift amount of the pack film F4 in the width direction.

Additionally, the position shift amount calculator 916 acquires information, stored in the regular dimension storage 931, expressing a regular dimension A3$c$ of the shortest distance between the slit SL1 formed along the longitudinal direction of the packaging pack BP1 and the periphery of one of the pockets Po1 positioned on both sides, in the lateral direction of the packaging pack BP1, of that slit SL1. Moreover, the position shift amount calculator 916 calculates, as the position shift amount $\Delta As$ of the slit forming position in the conveyance direction of the pack film F4, the difference (A3–A3$c$) obtained by subtracting the regular dimension A3$c$ expressed in the acquired information from the shortest distance A3 calculated by the packaging pack pocket position calculator 914 described above.

Furthermore, the position shift amount calculator 916 acquires information, stored in the regular dimension storage 931, expressing regular dimensions A41$c$, A42$c$ of the shortest distances between the center of the mark MK1 in the lateral direction of the packaging pack BP1 and the periphery of each of two pockets Po1. Moreover, the position shift amount calculator 916 calculates, on the basis of the relational expression of Equation (3) below, a position shift amount of the mark MK1 in the conveyance direction of the pack film F4.

$$\Delta Am = (a41 - a42) - (a41c - a42c) \quad (3)$$

Here, A41 and A42 respectively represent the shortest distance, calculated by the mark position calculator 915 described above, between the center of the mark MK1 and the periphery of each of the two pockets Po1. Furthermore, Am represents the position shift amount of the mark MK1 in the conveyance direction of the pack film F4.

Additionally, the position shift amount calculator 916 acquires information, stored in the regular dimension storage 931, expressing a regular dimension a4$c$ of the shortest distance between the center of the mark MK1 in the longitudinal direction of the packaging pack BP1 and one edge of the packaging pack BP1 in the longitudinal direction. Moreover, the position shift amount calculator 916 calculates, as a position shift amount $\Delta am$ of the mark MK1 in the width direction of the pack film F4, a difference (a4–a4$c$) obtained by subtracting the regular dimension a4$c$ expressed in the acquired information from the shortest distance a4 calculated by the mark position calculator 915 described above.

Furthermore, the position shift amount calculator 916 acquires, for the plurality of regions P1 juxtaposed along the longitudinal direction of the container film F2, information, stored in the regular dimension storage 931, expressing a regular dimension A5c of the shortest distance between the peripheries of the pockets Po1 closest to the boundary portion BL1 of two adjacent regions P1. Moreover, the position shift amount calculator 916 calculates, as a position shift amount ΔAf of the pocket molding position in the conveyance direction of the container film F2, a difference (A5–A5c) obtained by subtracting the regular dimension A5c expressed in the acquired information from the shortest distance A5 calculated by the container film pocket position calculator 913 described above.

The determiner 917 acquires information, stored in the determination criteria storage 932, expressing the correction execution threshold for each of the position shift amounts ΔAc and Δac of the punching position, the position shift amounts ΔAs and Δas of the slit forming position, the position shift amounts Am and am of the mark position, and the position shift amount ΔAf of the pocket molding position. When one of the absolute values of the position shift amounts ΔAc and Δac of the punching position, the position shift amounts ΔAs and Δas of the slit forming position, the position shift amounts Am and am of the mark position, or the position shift amount ΔAf of the pocket molding position exceeds the correction execution threshold, the determiner 917 determines that correction of the punching position, the slit forming position, the mark position, or the pocket molding position is needed.

The determiner 917 acquires the pass/fail determination criteria information described above that is stored in the determination criteria storage 932. Then, the determiner 917 determines, on the basis of the pass/fail determination criteria information and the image information of the pack film F4 acquired from the imager 161 of the appearance inspection device 16, the pass/fail of portions corresponding to each packaging pack BP1 of the pack film F4. Then, the determiner 917 outputs, on the basis of determination results and to the rotary suction 32, control information for sorting out the defective articles of the packaging pack BP1.

When the determiner 917 determines that the position shift amounts ΔAc and/or Δac of the punching position exceed the correction execution thresholds, the punching position correction amount calculator 919 calculates the punching position correction amount in the conveyance direction or the width direction of the pack film F4 with respect to the punching position of the pack film F4. The punching position correction amount corresponds to an amount of correction of the punching position in the direction in which the absolute values of the position shift amounts ΔAc and/or Δac of the punching position decrease.

When the determiner 917 determines that the position shift amounts ΔAs, Δas of the slit forming position exceed the correction execution thresholds, the slit position correction amount calculator 920 calculates the slit forming position correction amount in the conveyance direction or the width direction of the pack film F4 with respect to the slit forming position of the pack film F4. The slit forming position correction amount corresponds to an amount of correction of the slit forming position in the direction in which the absolute values of the position shift amounts ΔAs, Δas of the slit forming position decrease. Additionally, when the conveyance controller 923 (described later) changes the rotation angle for when intermittently rotating the film feeding roller 2811 one predetermined rotation angle at a time, the slit position correction amount calculator 920 calculates a slit forming position correction amount in the conveyance direction of the pack film F4 resulting from this change of the rotation angle. This slit forming position correction amount corresponds to an amount of correction of the slit forming position in the direction in which the absolute value of the position shift amount, of the slit forming position in the conveyance direction of the pack film F4, resulting from the change of the rotation angle decreases.

When the determiner 917 determines that the position shift amounts ΔAm, Δam of the mark position where the mark MK1 is formed on the pack film F4 exceed the correction execution thresholds, the mark position correction amount calculator 921 calculates the mark position correction amount with respect to the mark position. The mark position correction amount corresponds to an amount of correction of the mark position in the direction in which the absolute values of the position shift amounts ΔAm, Δam of the mark position decrease. Additionally, when the conveyance controller 923 (described later) changes the rotation angle of the film feeding roller 2811, the mark position correction amount calculator 921 calculates a mark position correction amount in the conveyance direction of the pack film F4 resulting from this change of the rotation angle. This mark position correction amount corresponds to an amount of correction of the mark position in the direction in which the absolute value of the position shift amount, of the mark position in the conveyance direction of the pack film F4, resulting from the change of the rotation angle decreases.

When the determiner 917 determines that the position shift amount ΔAf of the pocket molding position of the container film F2 exceeds the correction execution threshold, the pocket molding position correction amount calculator 918 calculates the pocket molding position correction amount. The pocket molding position correction amount corresponds to an amount of correction of the pocket molding position in the direction in which the absolute value of the position shift amount ΔAf of the pocket molding position decreases.

The conveyance controller 923 functions as a rotation angle adjuster that adjusts, on the basis of the punching position correction amount calculated by the punching position correction amount calculator 919, the rotation angle for when the conveyor 281 intermittently rotates the film feeding roller 2811 one predetermined rotation angle at a time. When the determiner 917 determines that the absolute value of the position shift amount Δac of the punching position in the conveyance direction of the pack film F4 exceeds the correction execution threshold, the conveyance controller 923 generates and outputs, to the output interface 905, control information for adjusting the rotation angle. This control information is for adjusting the rotation angle so as to shift the punching position the punching position correction amount, calculated by the punching position correction amount calculator 919, in the conveyance direction of the pack film F4. Then, the output interface 905 generates and outputs, to the roller driver 2812, a control signal corresponding to the control information for adjusting the rotation angle input from the conveyance controller 923.

The film guide position controller 924 functions as a guider position adjuster that adjusts, on the basis of the punching position correction amount calculated by the punching position correction amount calculator 919, the position of the film guide 2831. When the determiner 917 determines that the absolute value of the position shift amount ΔAc of the punching position in the width direction of the pack film F4 exceeds the correction execution threshold, the film guide position controller 924 generates and outputs, to the output interface 905, control information for adjusting the position of the film guide 2831. This control information is for moving the film guide 2831 so as to shift the punching position the punching position correction amount, calculated by the punching position correction amount calculator 919, in the width direction of the pack film F4. Then, the output interface 905 generates and outputs, to the guide driver 2832, a control signal corresponding to the control information for moving the film guide 2831 input from the film guide position controller 924.

The slit position controller 926 functions as a guide roller position adjuster that adjusts, on the basis of the slit forming position correction amount calculated by the slit position correction amount calculator 920, the position of the guide roller 261. When the determiner 917 determines that the absolute values of the position shift amounts ΔAs, Δas of the slit forming position in the conveyance direction or the width direction of the pack film F4 exceed the correction execution thresholds, the slit position controller 926 generates and outputs, to the output interface 905, control information for adjusting the position of the guide roller 261. This control information is for moving the guide roller 261 so as to shift the slit forming position the slit position correction amount, calculated by the slit position correction amount calculator 920, in the conveyance direction or the width direction of the pack film F4. Then, the output interface 905 generates and outputs, to the guide driver 264, a control signal corresponding to the control information for moving the guide roller 261 input from the slit position controller 926. Additionally, when the conveyance controller 923 changes the rotation angle described above, the slit position controller 926 generates and outputs, to the output interface 905, control information for moving the guide roller 261 the slit position correction amount calculated by the slit position correction amount calculator 920 described above.

The printing controller 925 functions as a print head position adjuster that adjusts, on the basis of the mark position correction amount calculated by the mark position correction amount calculator 921, the position of the print head 272 of the printing device 27. When the determiner 917 determines that the absolute values of the position shift amounts ΔAm, Δam of the mark position in the conveyance direction or the width direction of the pack film F4 exceed the correction execution thresholds, the printing controller 925 generates and outputs, to the output interface 905, control information for adjusting the position of the print head 272. This control information is for moving the print head 272 so as to shift the mark position the mark position correction amount, calculated by the mark position correction amount calculator 921, in the conveyance direction or the width direction of the pack film F4. Then, the output interface 905 generates and outputs, to the supporter driver 275 of the printing device 27, a control signal corresponding to the control information for moving the print head 272 input from the printing controller 925. Additionally, when the conveyance controller 923 changes the rotation angle described above, the slit position controller 926 generates and outputs, to the output interface 905, control information for adjusting the position of the guide roller 261 so that the position of the guide roller 261 reduces the shift amount of the punching position in the conveyance direction of the pack film F4 resulting from the change of the rotation angle. Additionally, when the conveyance controller 923 changes the rotation angle described above, the printing controller 925 generates and outputs, to the output interface 905, control information for moving the print head 272 the mark position correction amount calculated by the mark position correction amount calculator 921 described above.

The chuck feed controller 922 functions as a feed amount adjuster that adjusts, on the basis of the pocket molding position correction amount calculated by the pocket molding position correction amount calculator 918, a second reference distance for when the chuck feed 232 intermittently conveys the container film F2 downstream one predetermined second reference distance at a time. When the determiner 917 determines that the absolute value of the position shift amount ΔAf of the pocket molding position exceeds the correction execution threshold, the chuck feed controller 922 generates and outputs, to the output interface 905, control information for adjusting the second reference distance. This control information is for increasing/decreasing the second reference distance the pocket molding position correction amount calculated by the pocket molding position correction amount calculator 918. Then, the output interface 905 generates and outputs, to the chuck feed 232, a control signal corresponding to the control information for adjusting the second reference distance input from the chuck feed controller 922.

Figure 11:
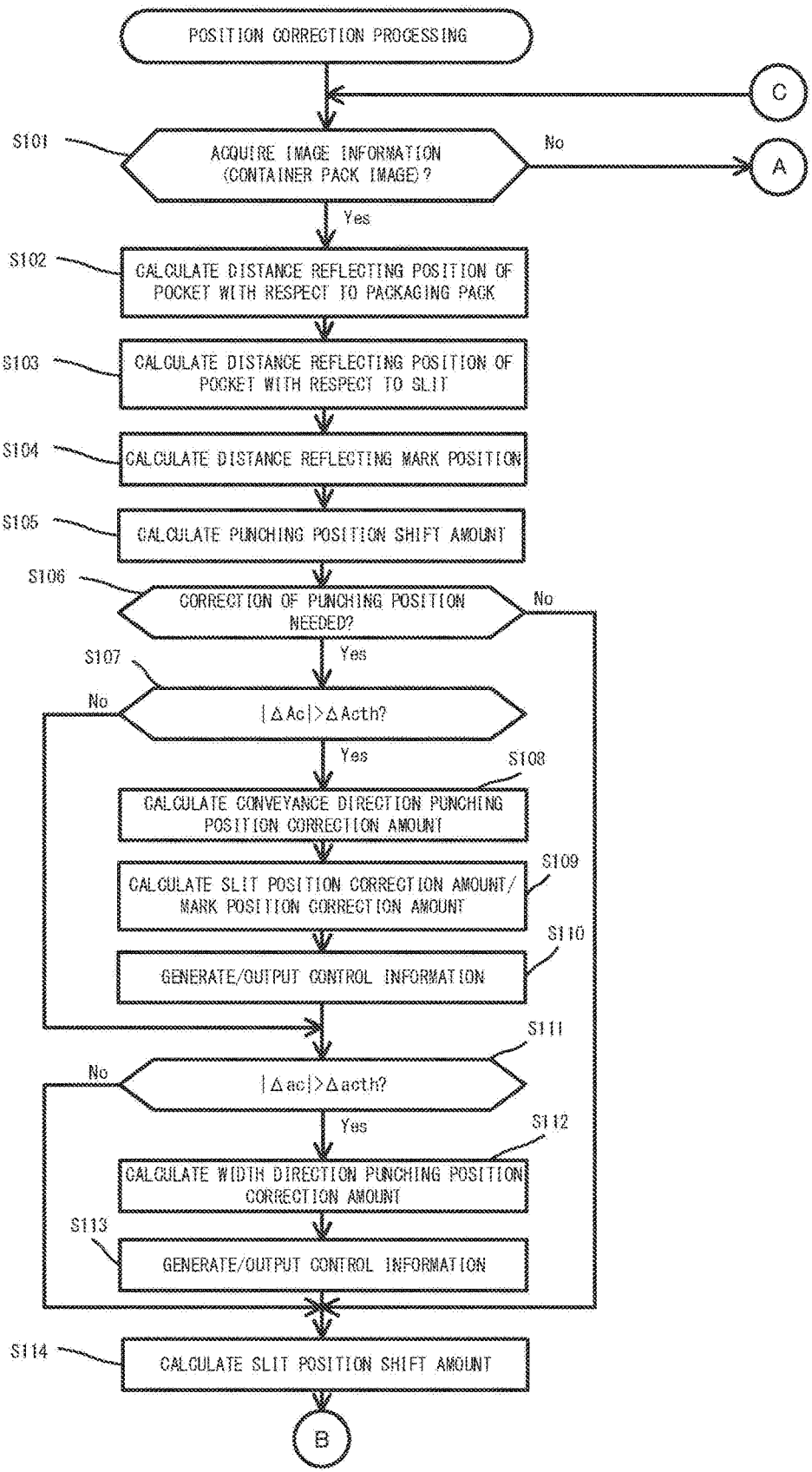
FIG. 11 is a flowchart illustrating an example of the flow of position correction processing executed by the controller according to the embodiment.
Figure 12:
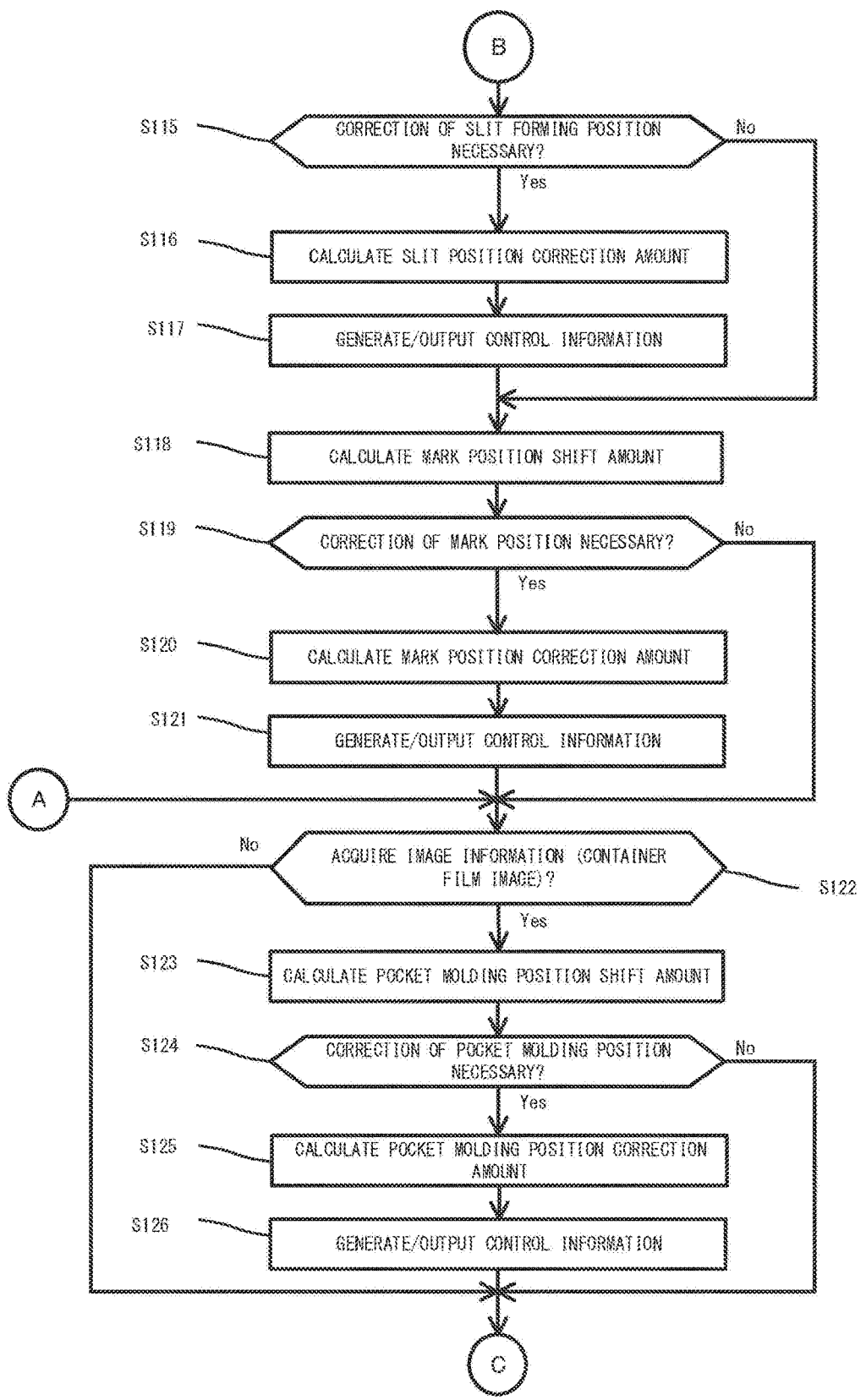
FIG. 12 is a flowchart illustrating an example of the flow of the position correction processing executed by the controller according to the embodiment.

Next, position correction processing executed by the control device 90 according to the present embodiment is described while referencing FIGS. 11 and 12. In one example, this position correction processing starts when the power to the control device 90 is turned ON. Firstly, as illustrated in FIG. 11, a determination is made of whether the packaging pack image acquirer 912 acquires, from the imager 311 of the appearance inspection device 31, image information expressing a packaging pack image (step S101). When a determination is made that the image information is not acquired by the packaging pack image acquirer 912 (step S101; No), the processing of step S122 (described later) is executed. However, it is assumed that the packaging pack image acquirer 912 determines that the image information is acquired (step S101; Yes). In this case, the packaging pack pocket position calculator 914 calculates, on the basis of the packaging pack image, a distance that reflects the relative position of the pocket Po1 with respect to the packaging pack BP1 (step S102). Here, the packaging pack pocket position calculator 914 calculates the shortest distances A1, A2, a1, a2 between the edges of the packaging pack BP1 and the peripheries of the pockets Po1.

Next, the packaging pack pocket position calculator 914 calculates, on the basis of the packaging pack image, distances that reflect the relative positions of the pockets Po1 with respect to the slits SL1, SL2 formed in the packaging pack BP1 (step S103). Here, the packaging pack pocket position calculator 914 calculates the shortest distances A3, a31, a32 between the slits SL1, SL2 formed in the packaging pack BP1 and the peripheries of the pockets Po1.

Next, the mark position calculator 915 calculates, on the basis of the packaging pack image, a distance that reflects the relative position of the mark, printed on the packaging pack BP1, with respect to the packaging pack BP1 (step S104). Here, the mark position calculator 915 calculates the shortest distances A41, A42 between the center of the mark MK1 and the peripheries of the pockets Po1, and the shortest distance a4 between the center of the mark MK1 and the edge of the packaging pack BP1.

Thereafter, the position shift amount calculator 916 calculates the position shift amounts ΔAc, Δac of the punching position from the calculated distances that reflect the relative position of the pocket Po1 with respect to the packaging pack BP1 (step S105).

Next, the determiner 917 determines, on the basis of the position shift amounts ΔAc, Δac of the punching position, whether correction of the punching position is needed (step S106). Here, when at least one of the absolute values |ΔAc|, |Δac| of the position shift amounts ΔAc, Δac of the punching position exceeds the correction execution threshold described above, the determiner 917 determines that correction of the punching position is needed. When the determiner 917 determines that correction of the punching position is not needed (step S106; No), the processing of step S114 (described later) is executed.

However, it is assumed that the determiner 917 determines that correction of the punching position is needed (step S106; Yes). In this case, the punching position correction amount calculator 919 determines whether the absolute value |ΔAc| of the position shift amount ΔAc of the punching position in the conveyance direction of the pack film F4 exceeds a correction execution threshold ΔActh (step S107). When the punching position correction amount calculator 919 determines that the absolute value |ΔAc| of the position shift amount ΔAc of the punching position in the conveyance direction of the pack film F4 is less than or equal to the correction execution threshold ΔActh (step S107; No), the processing of step S111 (described later) is executed. Meanwhile, when the punching position correction amount calculator 919 determines that the absolute value |ΔAc| of the position shift amount ΔAc of the punching position in the conveyance direction of the pack film F4 exceeds the correction execution threshold ΔActh (step S107; Yes), the punching position correction amount calculator 919 calculates the punching position correction amount in the conveyance direction of the pack film F4 (step S108). Then, the slit position correction amount calculator 920 calculates the slit forming position correction amount in the conveyance direction of the pack film F4 resulting from the change of the rotation angle of the conveyor 281, and the mark position correction amount calculator 921 calculates the mark position correction amount in the conveyance direction of the pack film F4 resulting from the change of the rotation angle of the conveyor 281 (step S109).

Thereafter, the conveyance controller 923 generates and outputs, to the output interface 905, the control information for adjusting the rotation angle of the conveyor 281 on the basis of the punching position correction amount in the conveyance direction of the pack film F4 calculated by the punching position correction amount calculator 919 (step S110). At this time, the slit position controller 926 generates and outputs, to the output interface 905, the control information for moving the guide roller 261 the slit position correction amount calculated by the slit position correction amount calculator 920 described above. Additionally, the printing controller 925 generates and outputs, to the output interface 905, the control information for moving the print head 272 the mark position correction amount calculated by the mark position correction amount calculator 921 described above.

Next, the punching position correction amount calculator 919 determines whether the absolute value |Δac| of the position shift amount Δac of the punching position in the width direction of the pack film F4 exceeds a correction execution threshold Δacth (step S111). When the punching position correction amount calculator 919 determines that the absolute value |Δac| of the position shift amount Δac of the punching position in the width direction of the pack film F4 is less than or equal to the correction execution threshold Δacth (step S111; No) the processing of step S114 (described later) is executed. Meanwhile, when the punching position correction amount calculator 919 determines that the absolute value |Δac| of the position shift amount Δac of the punching position in the width direction of the pack film F4 exceeds the correction execution threshold Δacth (step S111; Yes), the punching position correction amount calculator 919 calculates the punching position correction amount in the width direction of the pack film F4 (step S112). Then, the film guide position controller 924 generates and outputs, to the output interface 905, the control information for adjusting the position of the film guide 2831 on the basis of the punching position correction amount in the width direction of the pack film F4 calculated by the punching position correction amount calculator 919 (step S113).

Thereafter, the position shift amount calculator 916 calculates the position shift amounts ΔAs, Δas of the slit forming positions from the calculated distances that reflect the relative position of the pocket Po1 with respect to the slits SL1, SL2 (step S114).

Next, as illustrated in FIG. 12, the determiner 917 determines, on the basis of the position shift amounts ΔAs, Δas of the slit forming position, whether correction of the slit forming position is needed (step S115). Here, when any of the absolute values of the position shift amounts ΔAs, Δas of the slit forming position exceed the correction execution thresholds described above, the determiner 917 determines that correction of the slit forming position is needed. When the determiner 917 determines that correction of slit forming position is not needed (step S115; No), the processing of step S118 (described later) is executed.

However, it is assumed that the determiner 917 determines that correction of the slit forming position is needed (step S115; Yes). In this case, the slit position correction amount calculator 920 calculates the slit forming position correction amount, in the conveyance direction or the width direction of the pack film F4, with respect to the slit forming position of the pack film F4 (step S116). Then, the slit position controller 926 generates and outputs, to the output interface 905, the control information for adjusting the position of the guide roller 261 on the basis of the slit forming position correction amount calculated by the slit position correction amount calculator 920 (step S117).

Thereafter, the position shift amount calculator 916 calculates, on the basis of the packaging pack image described above, the mark position shift amount of the mark MK1 described above (step S118).

Next, as illustrated in FIG. 12, the determiner 917 determines, on the basis of the position shift amounts ΔAm, Δam of the mark MK1, whether correction of the mark position is needed (step S119). Here, when at least one of the absolute values |ΔAm|, |Δam| of the position shift amounts ΔAm, Δam of the mark position exceeds the correction execution threshold described above, the determiner 917 determines that correction of the mark position is needed. When the determiner 917 determines that correction of slit forming position is not needed (step S119; No), the processing of step S122 (described later) is executed.

However, it is assumed that the determiner 917 determines that correction of the mark position is needed (step S119; Yes). In this case, the mark position correction amount calculator 921 calculates the mark position correction amount, in the conveyance direction and the width direction of the pack film F4, with respect to the mark position (step S120). Then, the printing controller 925 generates and outputs, to the output interface 905, the control information for adjusting the position of the print head 272 on the basis of the mark position correction amount calculated by the mark position correction amount calculator 921 (step S121).

Thereafter, a determination is made of whether the container film image acquirer 911 acquires, from the imager 131 of the appearance inspection device 13, image information expressing a container film image (step S122). When a determination is made that that the image information is not acquired by the container film image acquirer 911 (step S122; No), the processing of step S101 is executed again. However, it is assumed that the container film image acquirer 911 acquires the image information (step S101; Yes). In this case, the position shift amount calculator 916 calculates the position shift amount ΔAf of the pocket molding position in the conveyance direction of the container film F2 described above (step S123).

Next, the determiner 917 determines, on the basis of the position shift amount ΔAf of the pocket molding position in the container film F2, whether correction of the pocket molding position is needed (step S124). Here, when the absolute value |ΔAf| of the position shift amount ΔAf of the pocket molding position exceeds the correction execution threshold described above, the determiner 917 determines that correction of the pocket molding position is needed. When the determiner 917 determines that correction of the pocket molding position is not needed (step S124; No), the processing of step S101 is executed again.

However, it is assumed that the determiner 917 determines that correction of the pocket molding position is needed (step S124; Yes). In this case, the pocket molding position correction amount calculator 918 calculates the pocket molding position shift amount (step S125). Then, the chuck feed controller 922 generates and outputs, to the output interface 905, the control information for adjusting, on the basis of the pocket molding position correction amount calculated by the pocket molding position correction amount calculator 918, the second reference distance for when the chuck feed 232 intermittently conveys the container film F2 downstream one predetermined second reference distance at a time (step S126). Then, the processing of step S101 is executed again.

As described above, with the packaging machine 1 according to the present embodiment, the film position changer 283 includes the film guide 2831 that guides the pack film F4 and changes the position of the film guide 2831 in the width direction, that is, the X-axis direction of the pack film F4 to change the position in the width direction of the pack film F4 in the punching device 173. Moreover, the punching position correction amount calculator 919 calculates, from the pocket position shift amount described above, the punching position correction amount with respect to the punching position of the pack film F4. Additionally, the film guide position controller 924 adjusts the position of the film guide 2831 on the basis of the punching position correction amount. As a result, correction of the punching position in the width direction of the pack film F4 can be carried out without providing a drive mechanism for moving the entire punching device 173 in the width direction of the pack film F4. Therefore, the size of the packaging machine 1 can be reduced an amount corresponding to the drive mechanism for moving the entire punching device 173 in the width direction of the pack film F4, that has been made unnecessary. Additionally, the quality control of the packaging pack BP1 fabricated by the packaging machine 1 is facilitated and, due to this, benefits such as an improvement in the quality of the packaging pack BP1 and a reduction of labor in the process of fabricating the packaging pack BP1 are realized.

The relative position in the conveyance direction or the relative position in the width direction of the pack film F4 may shift due to variations in the shrinking performance of the pack film F4 and variations in the mechanical performance of the packaging machine 1. In such cases, there is a possibility of large amounts of defective articles of the packaging pack BP1 being produced, operational defects occurring in the sealing device 14, the slit forming device 171, the printing device 27, and/or the punching device 173, and the like. To solve this, with the packaging machine 1 according to the present embodiment, the feed amounts of the container film F2 and the pack film F4 in the sealing device 14, the slit forming device 171, the printing device 27, and the punching device 173 are configured to be constant on the basis of the image information obtained by imaging the packaging pack BP1 and the image information obtained by imaging the container film F2. Therefore, the defective articles of the packaging pack BP1 resulting from position shifts in the conveyance direction or the width direction of the pack film F4 can be reduced, and the occurrence of operational defects in the sealing device 14, the slit forming device 171, the printing device 27, and the punching device 173 can be suppressed.

With the packaging machine 1 according to the present embodiment, the film position changer 26 moves the guide roller 261 in the conveyance direction of the pack film F4 or in the width direction of the pack film F4 to change the position of the pack film F4 in the slit forming device 171. Additionally, the position shift amount calculator 916 calculates the slit position shift amount of the slits SL1, SL2 on the basis of the packaging pack image, and the slit position correction amount calculator 920 calculates the slit position correction amount with respect to the slit position at which the slits SL1, SL2 are to be formed. Moreover, the guide driver 264 adjusts the position of the guide roller 261 on the basis of the calculated slit position correction amount. As a result, correction of the slit position in the conveyance direction or the width direction of the pack film F4 can be carried out without providing a drive mechanism for moving the entire slit forming device 171 in the conveyance direction or the width direction of the pack film F4. Therefore, the size of the packaging machine 1 can be reduced an amount corresponding to the drive mechanism for moving the entire slit forming device 171 in the conveyance direction or the width direction of the pack film F4, that has been made unnecessary.

Furthermore, with the packaging machine 1 according to the present embodiment, the position shift amount calculator 916 calculates the mark position shift amount of the mark MK1 on the basis of the packaging pack image, and the mark position correction amount calculator 921 calculates the mark position correction amount with respect to the mark position from the calculated mark position shift amount. Moreover, the printing controller 925 adjusts, on the basis of the calculated mark position correction amount, the position of the print head 272 of the printing device 27. As a result, the occurrence of position shifts of the mark MK1 can be suppressed in configurations in which the mark MK1 is printed on the pack film F4 in the packaging machine 1.

When the conveyance controller 923 changes the rotation angle of the conveyor 281, the film position changer 26 according to the present embodiment generates and outputs the control information for adjusting the position of the guide roller 261 so as to reduce the shift amount of the slit forming position in the conveyance direction of the pack film F4 resulting from the change of the rotation angle. Additionally, as described above, when the rotation angle of the conveyor 281 is changed as described above, the printing controller 925 generates and outputs the control information for adjusting the position of the print head 272 so as to reduce the shift amount of the mark position in the conveyance direction of the pack film F4 resulting from the change of the rotation angle. As a result, when the rotation angle of the conveyor 281 is changed as described above, the occurrence of position shifts of the slit forming position and the mark position in the conveyance direction of the pack film F4 resulting from the change in the rotation angle can be suppressed.

Furthermore, the packaging machine 1 according to the present embodiment includes the imager 131 that is disposed upstream of the sealing device 14 and that images the container film F2, and the chuck feed 232 that is disposed downstream of the molding device 12, clamps the container film F2 from the thickness direction, and intermittently conveys the container film F2 downstream one second reference distance at a time. Additionally, the position shift amount calculator 916 calculates the pocket molding position shift amount of the pocket molding position on the basis of the container film image of the container film F2 imaged by the imager 131, and the pocket molding position correction amount calculator 918 calculates the pocket molding position correction amount from the pocket molding position shift amount. Moreover, the chuck feed controller 922 adjusts the second reference distance on the basis of the pocket molding position correction amount. As a result, occurrences of position shifts of the pocket molding position in the conveyance direction of the container film F2 can be suppressed.

The packaging machine 1 according to the present embodiment includes the rotary suction 32 described above. As such, it is possible to smoothly perform operations from receiving of the packaging pack BP1 from the punching device 173 to imaging of the packaging pack BP1 by the imager 311 of the appearance inspection device 31. Therefore, the manufacturing efficiency of the packaging pack BP1 can be improved.

Figure 13:
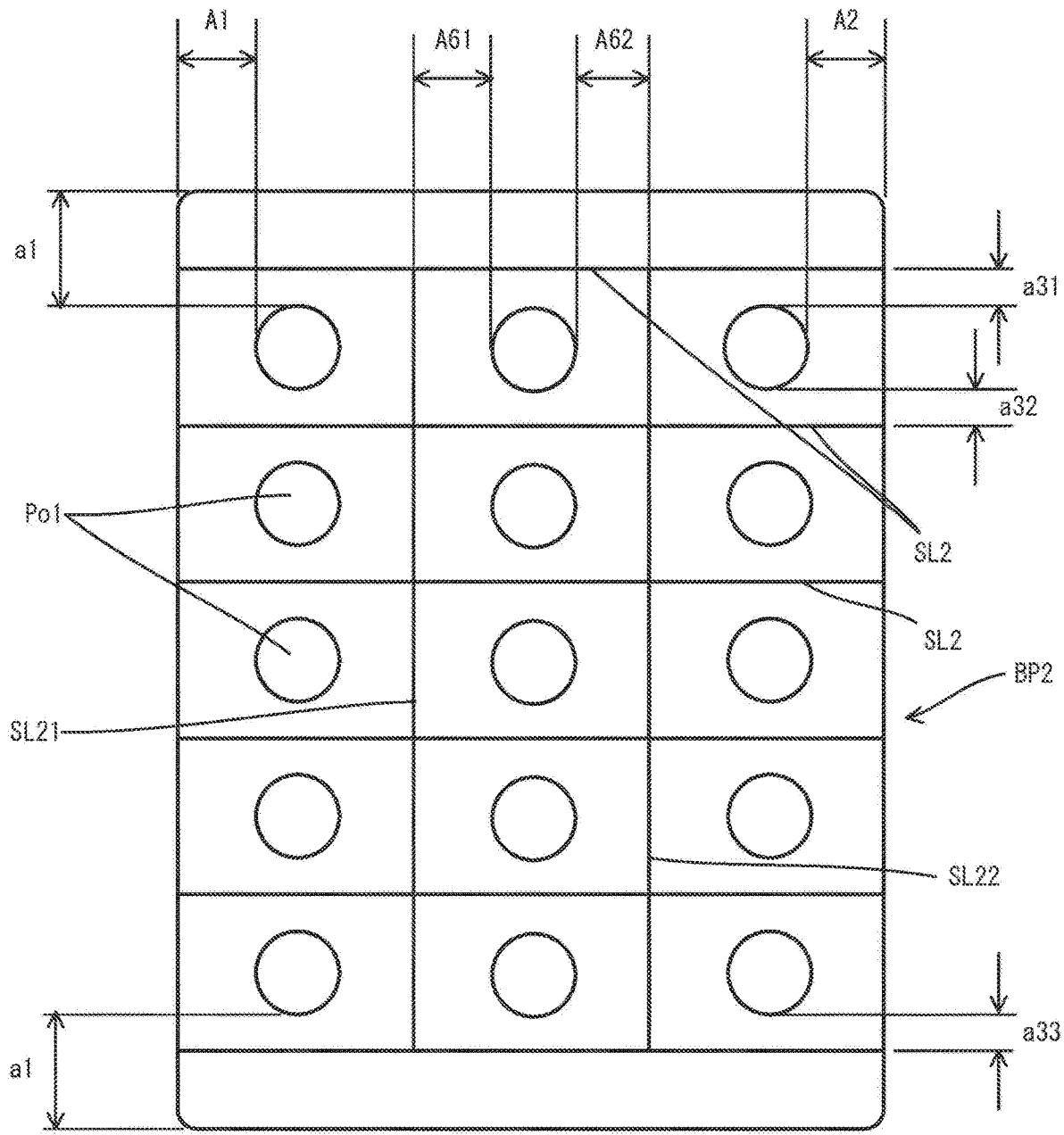
FIG. 13 is an operation explanation drawing of a packaging machine according to a modified example.

An embodiment of the present disclosure is described above, but the present disclosure is not limited to the configuration described in this embodiment. For example, as illustrated in FIG. 13, it is assumed that two slits SL21, SL22 are formed in the packaging pack BP2, along the longitudinal direction of the packaging pack BP2. In this case, a configuration is possible in which the packaging pack pocket position calculator 914 calculates shortest distances A61, A62, in the lateral direction of the packaging pack BP2, between each of the two slits SL21, SL22 and the periphery of the pocket Po1. In this case, the position shift amount calculator 916 acquires information, stored in the regular dimension storage 931, expressing regular dimensions A61c, A62c of the shortest distances, in the lateral direction of the packaging pack BP1, between each of the two slits SL21, SL22 and the periphery of the pocket Po1. Moreover, a configuration is possible in which the position shift amount calculator 916 calculates, on the basis of the relational expression of Equation (4) below, a position shift amount of the slit forming position the conveyance direction of the pack film F4.

$$\Delta As = (A61 - A62) - (A61c - A62c) \quad (4)$$

Here, A61 and A62 respectively represent the shortest distance in the lateral direction of the packaging pack BP2, calculated by the packaging pack pocket position calculator 914 described above, between each of the two slits SL21, SL22 and the periphery of the pocket Po1. Additionally, $\Delta As$ represents the position shift amount of the two slits SL21, SL22 in the conveyance direction of the pack film F4.

Figure 14:
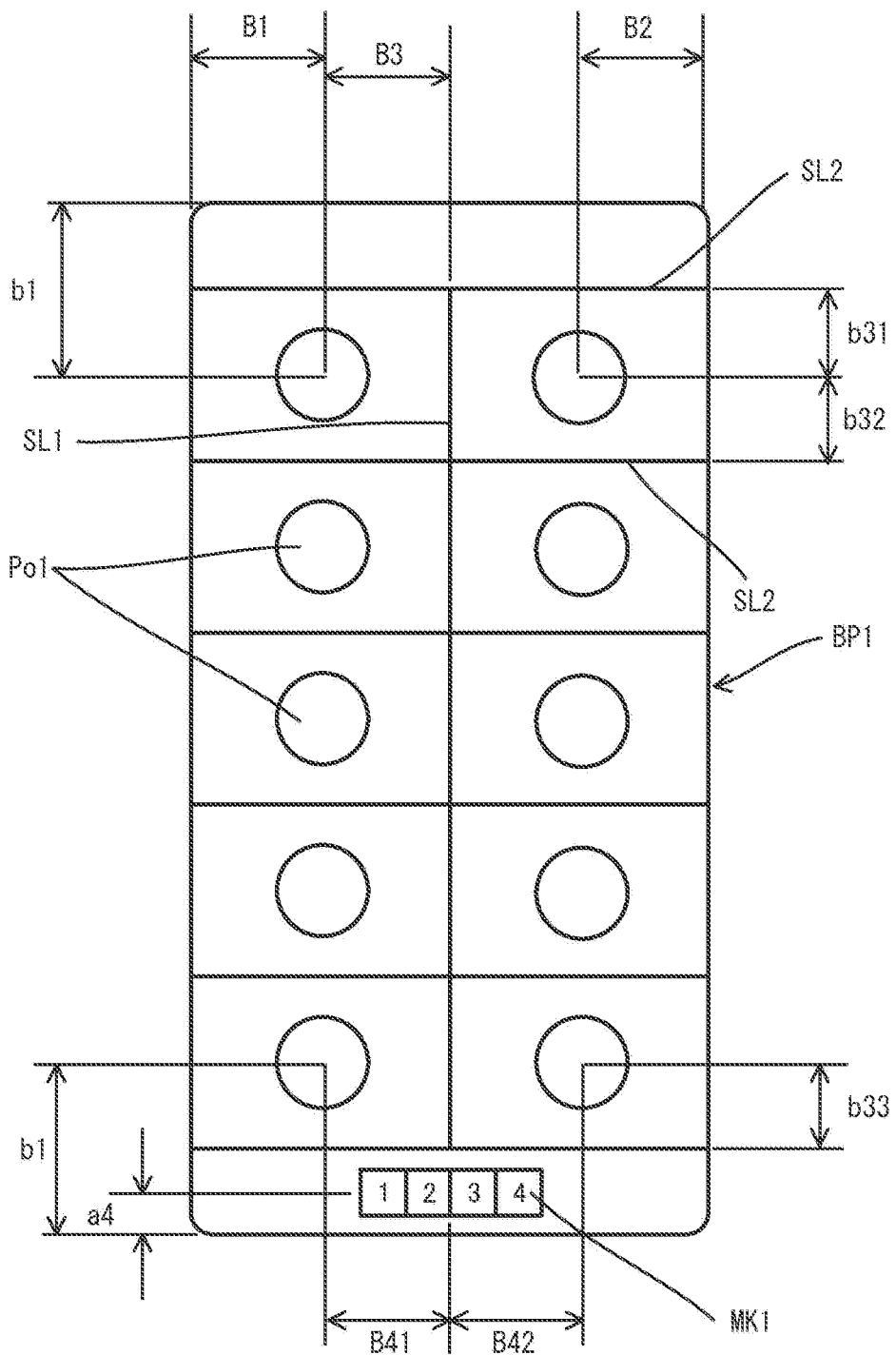
FIG. 14 is an operation explanation drawing of a packaging machine according to a modified example.

In the embodiment, as, for example, illustrated in FIG. 14, a configuration is possible in which the packaging pack pocket position calculator 914 calculates a distance B1 between one edge of the packaging pack BP1 in the lateral direction and the center of the pocket Po1 closest to that one edge, and a distance B2 between the other edge of the packaging pack BP1 in the lateral direction and the center of the pocket Po1 closest to that other edge. Additionally, a configuration is possible in which the packaging pack pocket position calculator 914 calculates a distance b1 between one edge of the packaging pack BP1 in the longitudinal direction and the center of the pocket Po1 closest to that one edge, and a distance b2 between the other edge of the packaging pack BP1 in the longitudinal direction and the center of the pocket Po1 closest to that other edge.

Additionally, in the embodiment, a configuration is possible in which the packaging pack pocket position calculator 914 calculate a distance B3 between the slit SL1 formed along the longitudinal direction of the packaging pack BP1 and the center of one of the pockets Po1 positioned on both sides, in the lateral direction of the packaging pack BP1, of that slit SL1. Moreover, a configuration is possible in which the packaging pack pocket position calculator 914 calculates distances b31, b32 between the center of the pocket Po1 closest to the one edge of the packaging pack BP1 in the longitudinal direction and the slits SL2 formed on both sides, in the longitudinal direction of the packaging pack BP1, of that pocket Po1. Furthermore, a configuration is possible in which the packaging pack pocket position calculator 914 calculates a distance b33 between the center of the pocket Po1 closest to the other edge of the packaging pack BP1 in the longitudinal direction and the slit SL2 formed on the other side, in the longitudinal direction of the packaging pack BP1, of that pocket Po1.

Furthermore, in the embodiment, as, for example, illustrated in FIG. 14, a configuration is possible in which the mark position calculator 915 calculates distances B41, B42 between the center of the mark MK1 in the lateral direction of the packaging pack BP1 and the center of each of two pockets Po1.

In the embodiment, an example is described in which the position shift amount calculator 916 acquires information, stored in the regular dimension storage 931, expressing the regular dimensions a31c, a33c of the shortest distances between the peripheries of the pockets Po1 and the slits SL2 and, on the basis of the relational expression of Equation (2) described above, calculates the position shift amount of the punching position in the width direction of the pack film F4. However, the embodiment is not limited thereto and, for example, a configuration is possible in which the position shift amount calculator 916 acquires information, stored in the regular dimension storage 931, expressing the regular dimension a31c (a32c, a33c) of the shortest distance between the periphery of the pocket Po1 and the slit SL2, and calculate, as the position shift amount of the punching position in the width direction of the pack film F4, a difference obtained by subtracting the regular dimension a31c (a32c, a33c) from the shortest distance a31 (a32, a33), calculated from the packaging pack image, between the periphery of the pocket Po1 and the slit SL2.

Alternatively, a configuration is possible in which the position shift amount calculator 916 acquires information, stored in the regular dimension storage 931, expressing the regular dimensions a31c, a32c of the shortest distances between the periphery of the pocket Po1 in the longitudinal direction of the packaging pack BP1 and the slits SL2 formed on both sides, in the longitudinal direction of the packaging pack BP1, of that pocket Po1, and, on the basis of the relational expression of Equation (5) below, calculates the position shift amount of the punching position in the width direction of the pack film F4.

$$\Delta as = (a31 - a32) - (a31c - a32c) \quad (5)$$

Figure 10:
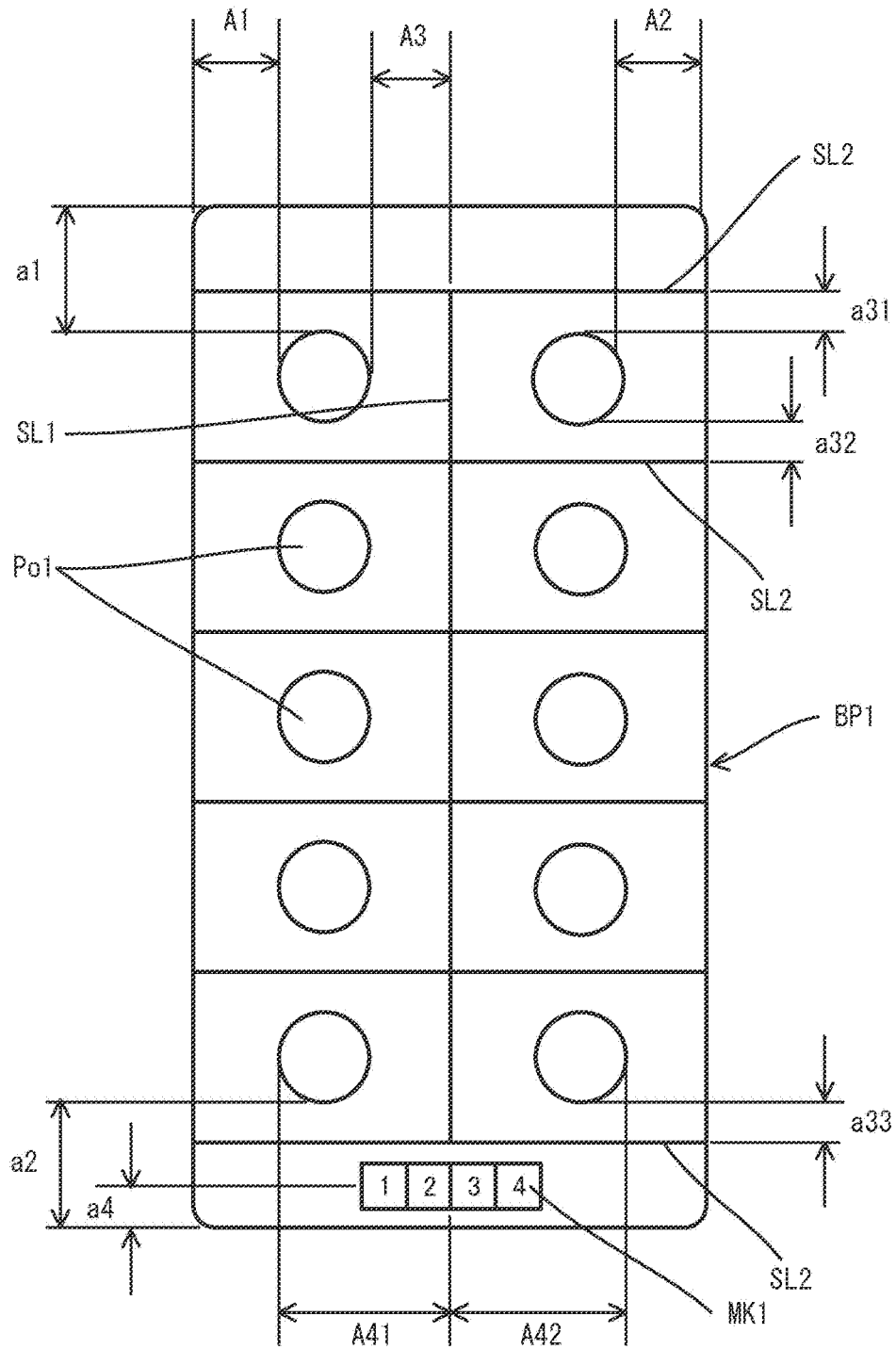
FIG. 10 is an operation explanation drawing of the packaging machine according to the embodiment.

Here, a31 and a32 represent the shortest distances, calculated by the packaging pack pocket position calculator 914 described above, between the periphery of the pocket Po1 and the slits SL2 formed on both sides, in the longitudinal direction of the packaging pack BP1, of that pocket Po1 (see FIG. 10). Additionally, Δas represents the position shift amount of the slit forming position in the width direction of the pack film F4.

In the embodiment, an example is described in which the printing device 27 stamps the mark on the pack film F4 by pressing the print head 272 against the die unit 273 while the pack film F4 is interposed between the print head 272 and the die unit 273. However, the configuration of the printing device 27 is not limited thereto and, for example, a configuration is possible in which a laser marker device is implemented. Additionally, when there is no need to provide a mark on the packaging pack BP1, the printing device 27 may be omitted. In this case, it is sufficient to provide the control device 90 with a configuration in which the mark position calculator 915, the mark position correction amount calculator 921, and the printing controller 925 are omitted.

In the embodiment, an example is described in which the second reference distance, for when the chuck feed 232 intermittently conveys the container film F2 downstream one predetermined second reference distance at a time, is adjusted on the basis of the pocket molding position correction amount calculated by the pocket molding position correction amount calculator 918. However, the embodiment is not limited thereto and, for example, a configuration is possible in which the control device 90 controls the powder clutch brake 2922 of the tension adjuster 292 on the basis of the pocket molding position correction amount calculated by the pocket molding position correction amount calculator 918 to adjust the rotational torque of the roller 2921.

Figure 15A:
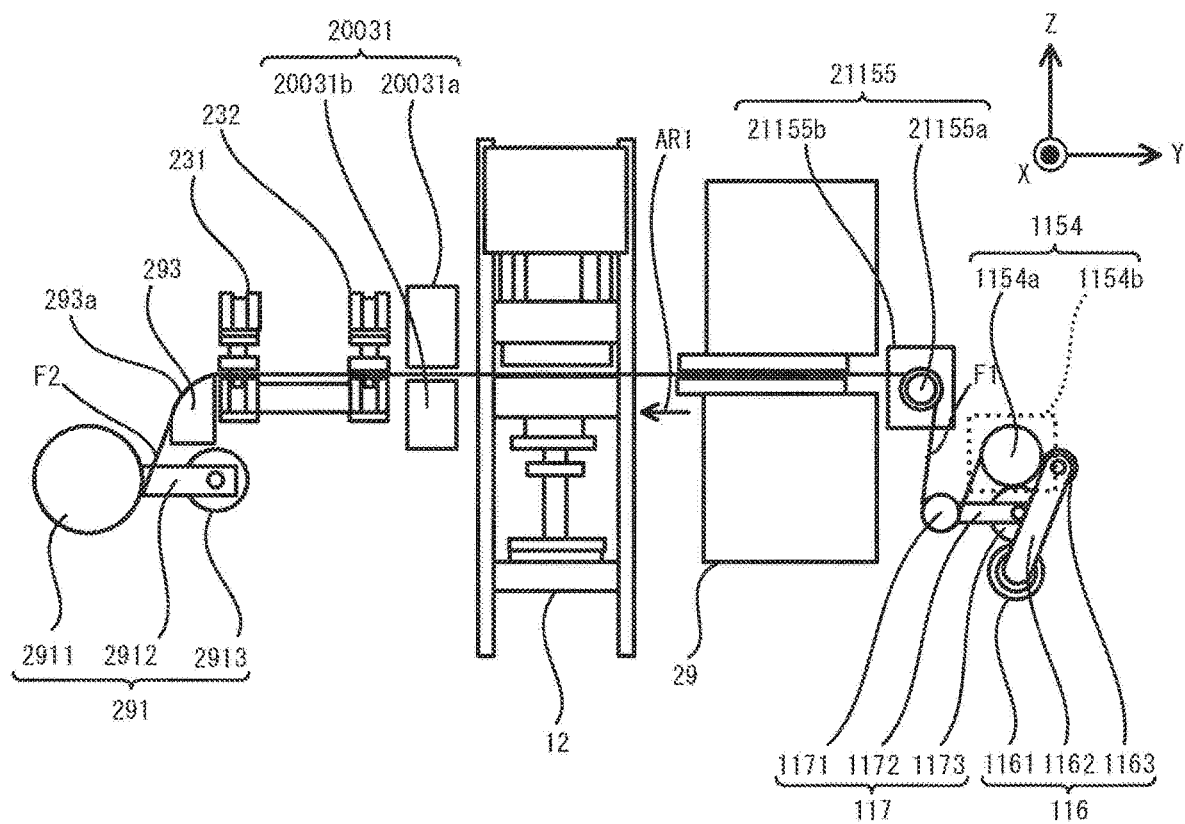
FIG. 15A is a schematic configuration drawing illustrating a portion of a packaging machine according to a modified example.

In the embodiment, as, for example, illustrated in FIG. 15A, a configuration is possible in which the packaging machine further includes an edge sensor 20031 disposed downstream of the molding device 12, and a film position changer 21155 disposed upstream of the heating device 29. In this case, the edge sensor 20031 includes two sets of laser sources 20031a and light receivers 20031b disposed facing each other at both edges in the width direction of the container film F2, and detects the positions of both edges in the width direction of the container film F2. Specifically, when, for example, laser light emitted from the laser sources 20031a is blocked by one of both edges of the container film F2 and does not reach the light receiver 20031b, the edge sensor 20031 outputs, to the control device, an identification signal of the light receiver 20031b, of the two light receivers 20031b, that does not receive the laser light. Note that, the edge sensor may include one laser source and light receiver disposed facing each other at only one edge in the width direction of the container film F2, and detect the position of one edge in the width direction of the container film F2.

Figure 15B:
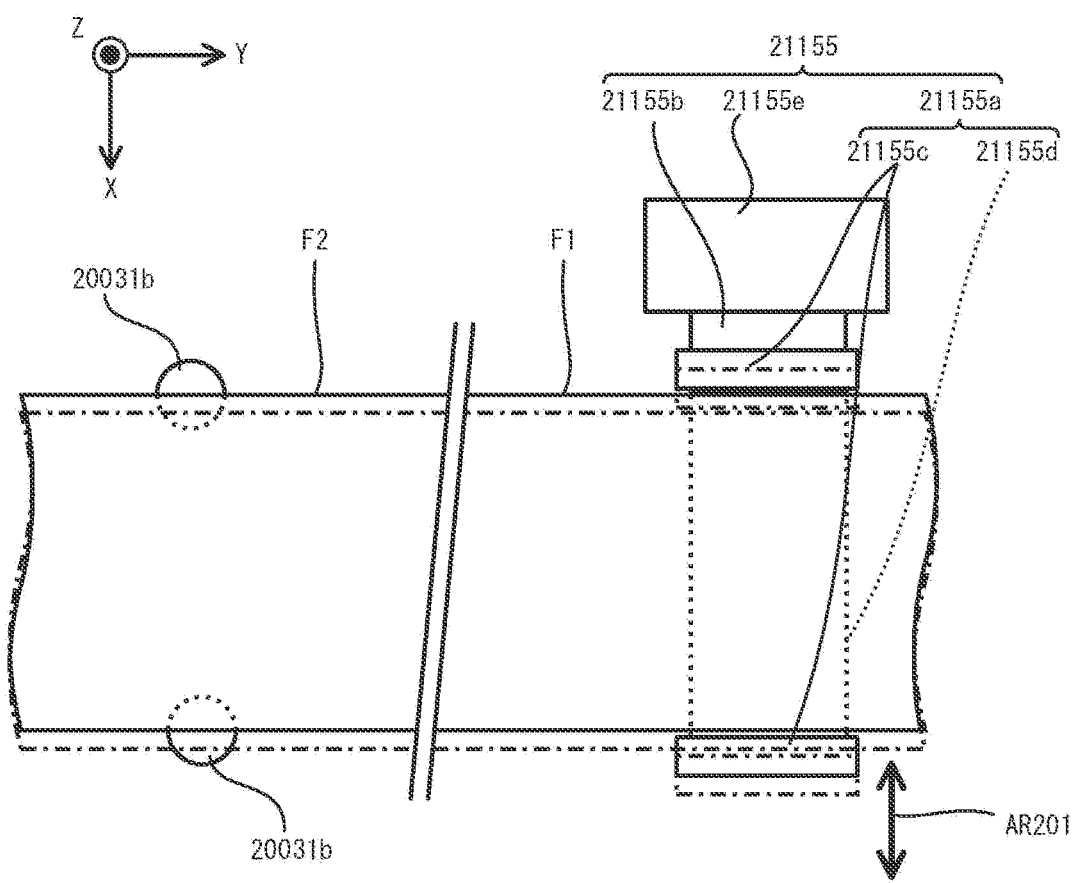
FIG. 15B is an operation explanation drawing of a film position changer according to the modified example.

The film position changer 21155 is, as illustrated in FIG. 15B, for example, a third film position changer that includes a guide roller 21155a that guides the raw material film F1 to be fed to the molding device 12, a roller supporter 21155b that rotatably supports the guide roller 21155a, and a guide driver 21155e. The guide roller 21155a is a second guide roller that includes a cylindrical roller main body 21155d, and two disc-like guiders 21155c provided at both ends in the cylinder-axis direction of the roller main body 21155d. The guide driver 21155e moves, via the roller supporter 21155b, the guide roller 21155a in the width direction of the raw material film F1, that is, in the X-axis direction (see arrow AR201 of FIG. 15B). In one example, as illustrated by the dot-dash line of FIG. 15B, the guide driver 21155e shifts the position of the guide roller 21155a to the +X direction side to change the position in the X-axis direction of the raw material film F1 in the molding device 12 to a position shifted to the +X direction side.

The control device according to the present modified example has the same configuration as the control device 90 described in Embodiment 1 and, in addition to the features of the control device 90, also includes a raw material film position correction amount calculator and a roller position adjuster. The raw material film position correction amount calculator calculates, on the basis of the positions of both ends of the container film F2 detected by the edge sensor 20031, a raw material film position correction amount of the raw material film F1 in the width direction. Specifically, when the identification signal of the light receiver 20031b that does not receive the laser light is received from the edge sensor 20031, the raw material film position correction amount calculator calculates, from the distance between the two light receivers 20031b, a raw material film position correction amount for shifting the raw material film F1 from the light receiver 20031b corresponding to the identification signal toward the other light receiver 20031b side, a distance corresponding to ½ the difference from the width of the raw material film F1.

The roller position adjuster is a second guide roller position adjuster that adjusts, on the basis of the raw material film position correction amount, the position of the guide roller 21155a. The roller position adjuster generates and outputs, to the output interface of the control device, control information for adjusting the position of the guide roller 21155a. Then, the output interface generates and outputs, to the guide driver 21155e, a control signal corresponding to the control information input from the roller position adjuster.

According to the present configuration, the need to manually adjust the position of the raw material film F1 in the width direction is eliminated and, as such, the labor in the process of manufacturing the packaging pack BP1 can be reduced.

Figure 16A:
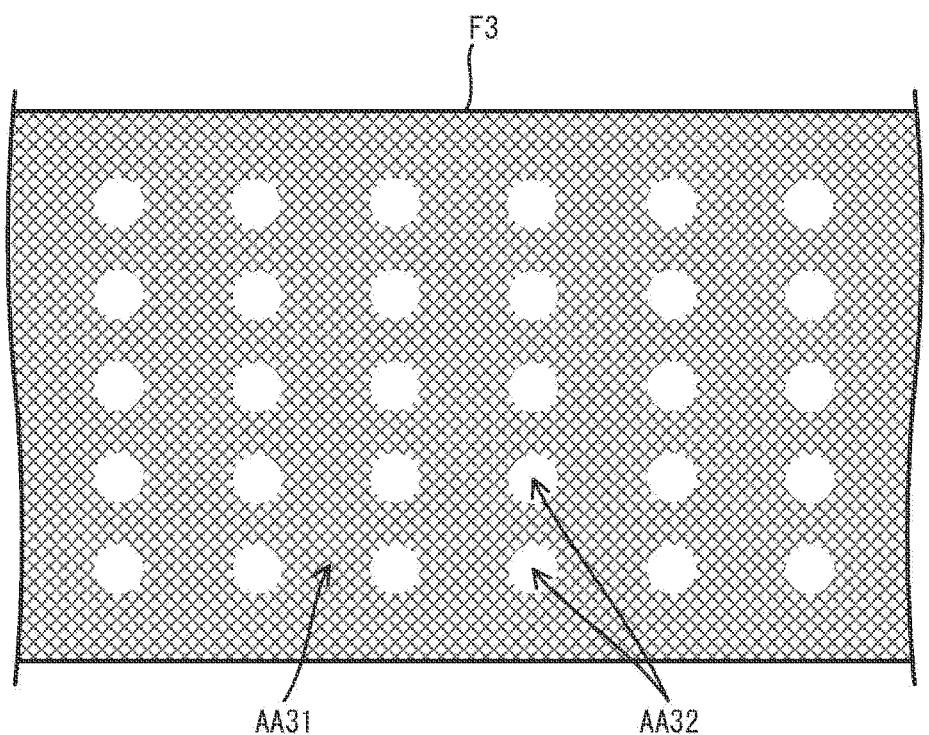
FIG. 16A is a plan view illustrating an example of a cover film according to a modified example.
Figure 16B:
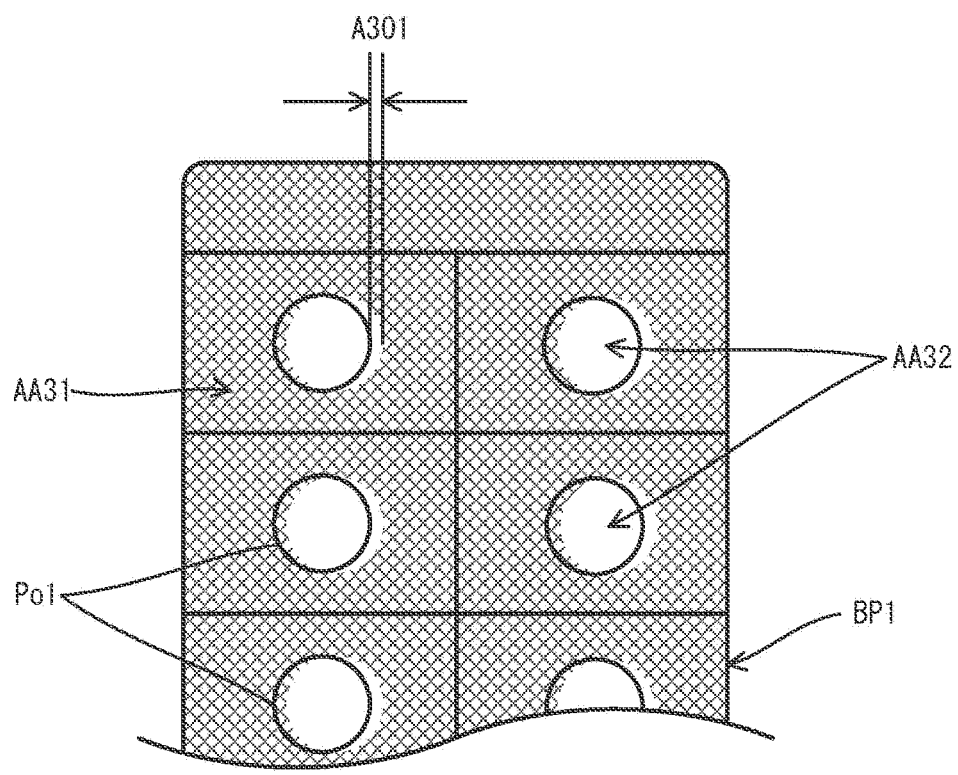
FIG. 16B is an operation explanation drawing of a packaging machine according to the modified example.

In the embodiment, as illustrated in FIG. 16A, a configuration is possible in which the cover film F3 includes an adhesion region AA31 that is caused to adhere to the container film F2, and non-adhesion regions AA32 that are disposed at positions facing the pockets Po1 in the container film F2 and that are not caused to adhere to the container film F2. Moreover, as illustrated in FIG. 16B, a configuration is possible in which the position shift amount calculator 916 calculates, on the basis of the pack packaging image captured by the imager 311 of the appearance inspection device 31, a non-adhesion region position shift amount A301 of the non-adhesion regions AA32 with respect to the positions of the pockets Po1. In this case, it is sufficient that the pocket molding position correction amount calculator 918 calculates the pocket molding position correction amount from the non-adhesion region position shift amount A301.

According to the present configuration, when the cover film F3 includes the adhesion region AA31 and the non-adhesion regions AA32, shifts between the positions of the pockets Po1 and the positions of the non-adhesion regions AA32 can be reduced and, as such, the rate of occurrence of appearance defects in the packaging pack BP1 can be reduced.

In the embodiment, an example is described in which the packaging machine 1 includes the fixed chuck 231, but the embodiment is not limited thereto and a configuration is possible in which the fixed chuck 231 is not provided.

In the embodiment, an example is described in which the packaging machine 1 includes the appearance inspection device 16, but the embodiment is not limited thereto and a configuration is possible in which the appearance inspection device 16 is not provided. In this case, it is sufficient that the appearance inspection device 31, for example, takes on the role of the appearance inspection device 16. Additionally, in the embodiment, an example is described in which the imager 311 of the appearance inspection device 31 images the packaging pack BP1 disposed at the imaging position while being held by the chuck unit 322a of the rotary suction 32. However, the embodiment is not limited thereto, and the imager 311 of the appearance inspection device 31 may image the packaging pack BP1 that is placed on the belt conveyor 331 of the pack conveying device 33.

In the embodiment, provided that the position shift amount $\Delta ac$ of the punching position in the conveyance direction of the pack film F4 is not 0, the conveyance controller 923 may, each time, generate and output, to the output interface 905, control information for adjusting the rotation angle of the film feeding roller 2811 so that the position shift amount $\Delta ac$ is 0. Alternatively, the conveyance controller 923 may observe, during a predetermined period, the trend of the position shift amount $\Delta ac$ of the punching position in the conveyance direction of the pack film F4 and, on the basis of an average value or a maximum value of the observed position shift amount $\Delta ac$, generate and output, to the output interface 905, control information for adjusting the rotation angle.

In the embodiment, provided that the position shift amount $\Delta Ac$ of the punching position in the width direction of the pack film F4 is not 0, the film guide position controller 924 may, each time, generate and output, to the output interface 905, control information for adjusting the position of the film guide 2831 so that the position shift amount $\Delta Ac$ is 0. Alternatively, the film guide position controller 924 may observe, during a predetermined period, the trend of the position shift amount $\Delta Ac$ of the punching position in the width direction of the pack film F4 and, on the basis of an average value or a maximum value of the observed position shift amount $\Delta Ac$, generate and output, to the output interface 905, control information for adjusting the position of the film guide 2831.

In the embodiment, provided that the position shift amounts $\Delta As$, $\Delta as$ of the slit forming position in the conveyance direction or the width direction of the pack film F4 is not 0, the slit position controller 926 may, each time, generate and output, to the output interface 905, control information for adjusting the position of the guide roller 261 so that the position shift amounts $\Delta As$, $\Delta as$ are 0. Alternatively, the slit position controller 926 may observe, during a predetermined period, the trends of the position shift amounts $\Delta As$, $\Delta as$ of the slit forming position in the conveyance direction or the width direction of the pack film F4 and, on the basis of an average value or a maximum value of the observed position shift amounts $\Delta As$, $\Delta as$, generate and output, to the output interface 905, control information for adjusting the position of the guide roller 261.

In the embodiment, provided that the position shift amounts $\Delta Am$, $\Delta am$ of the mark position in the conveyance direction or the width direction of the pack film F4 is not 0, the printing controller 925 may, each time, generate and output, to the output interface 905, control information for adjusting the position of the print head 272 so that the position shift amounts $\Delta Am$, $\Delta am$ are 0. Alternatively, the printing controller 925 may observe, during a predetermined period, the trends of the position shift amounts $\Delta Am$, $\Delta am$ of the mark position in the conveyance direction or the width direction of the pack film F4 and, on the basis of an average value or a maximum value of the observed position shift amounts $\Delta Am$, $\Delta am$, generate and output, to the output interface 905, control information for adjusting the position of the print head 272.

In the embodiment, provided that the position shift amount $\Delta Af$ of the pocket molding position is not 0, the chuck feed controller 922 may, each time, generate and output, to the output interface 905, control information for adjusting the second reference distance that is the feed amount of the chuck feed 232 so that the position shift amount $\Delta af$ is 0. Alternatively, the chuck feed controller 922 may observe, during a predetermined period, the trend of the position shift amount $\Delta Af$ of the pocket molding position and, on the basis of an average value or a maximum value of the observed position shift amount $\Delta Af$, generate and output, to the output interface 905, control information for adjusting the second reference distance.

In the embodiment, an example is described in which the control device 90 is provided inside the packaging machine main body 50, but the embodiment is not limited thereto, and a configuration is possible in which the control device 90 is disposed outside the packaging machine main body 50.

In the embodiment, an example is described in which the film position changer 283 changes the position in the X-axis direction of the pack film F4 in the punching device 173. However, the embodiment is not limited thereto and, for example, a configuration is possible in which the conveyor 281 includes a roller driver (not illustrated in the drawings) that changes the position in the X-axis direction of the pack film F4 by moving the film feeding roller 2811 in the X-axis direction of the pack film F4, and the conveyor 281 functions as a film position changer. Moreover, in the printing device 27, when the pack film F4 is shifted in the X-axis direction on the conveyor 281, it is sufficient to move, in correspondence therewith, the position of the print head 272 in the X-axis direction.

According to the present configuration, it is possible to reduce the number of components by omitting the film position changer 283 and, as such, it is possible to simplify and reduce the size of the packaging machine 1.

In the embodiment, a configuration is possible in which, when text or a mark is printed on the cover film F3, the control device 90 calculates, on the basis of an image of the packaging pack BP1 obtained by imaging by the appearance inspection device 31, a relative position shift amount of the cover film F3 with respect to the container film F2. In this case, a configuration is possible in which, for example, the control device 90 calculates a position shift amount of the cover film F3 with respect to the container film F2 on the basis of a distance between the text or the mark printed on the cover film F3 and an edge of the packaging pack BP1. Moreover, a configuration is possible in which the control device 90 adjusts, on the basis of the calculated position shift amount of the cover film F3 with respect to the container film F2, the reference position of the cover film F3 used by the position sensor 154.

Figure 17A:
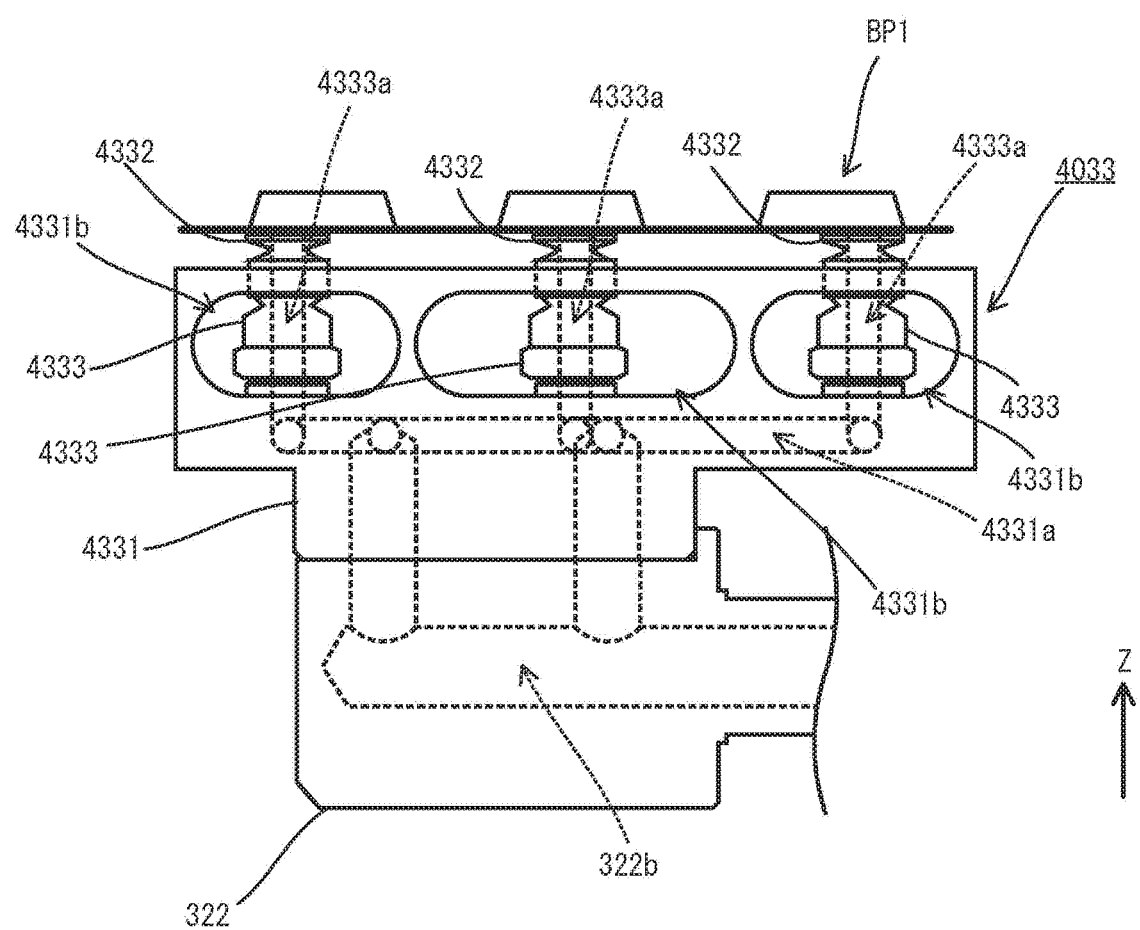
FIG. 17A is a side view of a chuck unit according to a modified example.
Figure 17B:
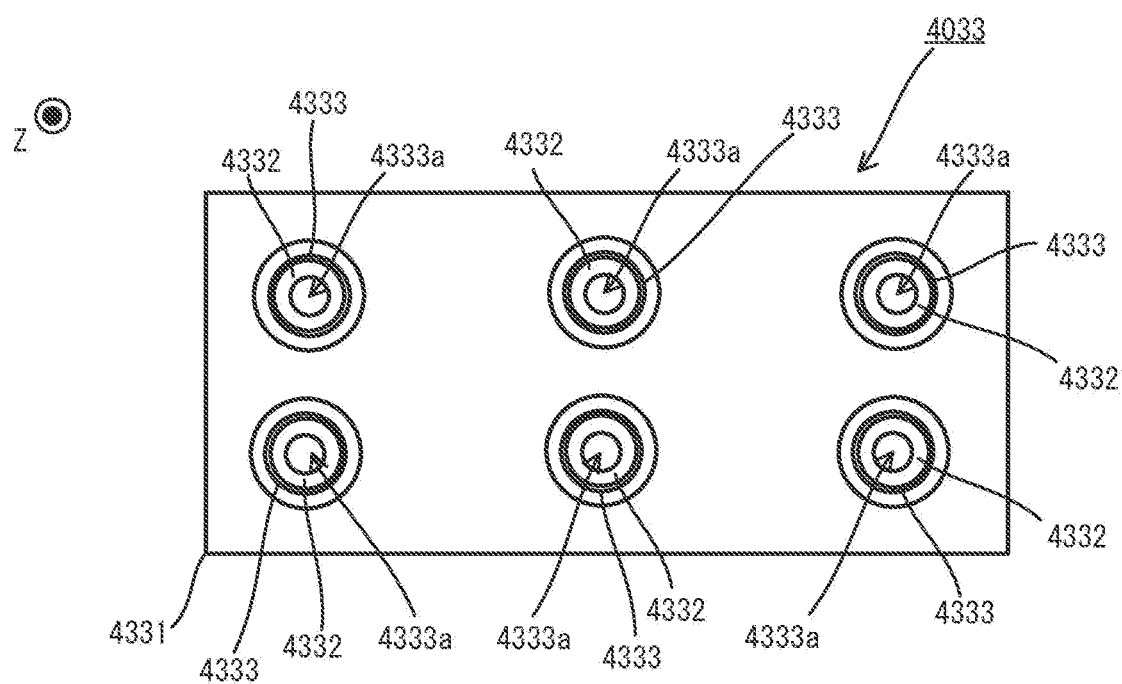
FIG. 17B is a plan view of the chuck unit according to the modified example.

In the embodiment, a configuration is possible in which the rotary suction 32 includes a chuck unit 4033 as illustrated in, for example, FIGS. 17A and 17B. The chuck unit 4033 is detachably fixed to each of the four arms 322 of the rotary suction 32. The chuck unit 4033 includes a plurality of (six in FIG. 17B) suction heads 4333, a suction pad 4332 that is formed from an elastic material and that is mounted on a tip of each of the plurality of suction heads 4333, and a head supporter 4331 that has a rectangular box-like shape, collectively supports the plurality of suction heads 4333, and is detachable from the arm 322. A pipe 4333a maintained in a reduced pressure state when the packaging pack BP1 is suctioned is provided inside each of the suction heads 4333. Additionally, a pipe 4331a that communicates with each of the pipes 4333a is provided inside the head supporter 4331. Furthermore, a plurality of windows 4331b is provided on a side wall of the head supporter 4331. As a result, the ease of work of a worker to replace the suction pad 4332 can be improved, and the weight of the head supporter 4331 can be reduced. Additionally, a hole (not illustrated in the drawings) into which a square column-like fixing pin (not illustrated in the drawings), that protrudes from the arm 322 toward the +Z-direction side, is fitted is provided on the −Z direction side of the head supporter 4331. Moreover, the head supporter 4331 is fixed to the arm 322 as a result of the fixing pin of the arm 322 being fitted into the hole. Furthermore, in a state in which the chuck unit 4033 is fixed to the arm 322, the pipe 4331a communicates with an exhaust pipe 322b that is provided in the arm 322 and that is connected to a vacuum pump (not illustrated in the drawings). Additionally, at least a portion of the suction pad 4332, the suction head 4333, and the head supporter 4331 are formed from resin, for example. In this case, at least a portion of the suction pad 4332, the suction head 4333, and the head supporter 4331 may be manufactured using a 3D printer, for example.

There are cases in which the packaging pack BP1 is transferred to the rotary suction 32 in a state in which the entire packaging pack BP1 is warped (a bent state). In such cases, the focus of the imager 311 in the appearance inspection device 31 will shift, causing the captured image of the target imaging portion of the packaging pack BP1 to be not sharp, and it may be impossible to accurately recognize the mark provided on the packaging pack BP1 or inspect for the presence/absence of foreign matter or debris adhered to the packaging pack BP1. Additionally, when using the captured image captured by the appearance inspection device 31 to measure the length of the packaging pack BP1, the length of the packaging pack BP1 cannot be accurately measured if the entire packaging pack BP1 is in a warped state.

In response to this, as illustrated in FIG. 17A, the chuck unit 4033 according to the present modified example holds the packaging pack BP1 in a state suctioned to the plurality of suction pads 4332. As a result, the packaging pack BP1 is flattened and then imaged by the imager 311 and, as such, the sharpness of the captured image obtained by imaging using the imager 311 can be improved. Accordingly, it is possible for the appearance inspection device 31 to more accurately recognize the mark provided on the packaging pack BP1 or inspect for the presence/absence of foreign matter or debris adhered to the packaging pack BP1. Additionally, when using the captured image captured by the appearance inspection device 31 to measure the length of the packaging pack BP1, the length of the packaging pack BP1 can be accurately measured.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2019-100953, filed on May 30, 2019, the entire disclosure of which is incorporated by reference herein.

INDUSTRIAL APPLICABILITY

The present disclosure is suitable for the manufacturing of pack films for packaging tablets, medical devices, and the like.

REFERENCE SIGNS LIST

1 Packaging machine
11 Raw material film feeding unit
12 Molding device
13, 16, 31 Appearance inspection device
14 Sealing device
15 Cover film feeding unit
17 Slit forming/punching unit
26, 283 Film position changer
27 Printing device
29 Heating device
32 Rotary suction
33 Pack conveying device
34 Collection unit
40 Stage
50 Packaging machine main body
90 Control device
111, 112, 151 Reel
113 Automatic film adhering device
116 Film pressing mechanism
117 Bufferer
121 Device main body
122 Second mold
122a Plug
123 First mold
123a Recess
124, 125, 172, 231c, 2321c Driver
131, 161, 311 Imager
132, 162, 312, 1723 Housing
141, 1154 Conveyor
142 Presser
143 Heater
143a Heat transfer roller
153, 292 Tension adjuster
154 Position sensor
171 Slit forming device
173 Punching device
231 Fixed chuck
231a, 271, 1173, 2321a, 2523 Supporter 231b, 2321b Clamp
232 Chuck feed
241, 242, 253, 276, 1151, 1152, 1153, 1154a, 1155, 1161, 1163, 1171, 1421, 1441, 1442, 1521, 1522, 1523, 1531, 2521, 2821, 2911 Roller
141a, 251a, 261a, 2811a Wheel
141b, 251b, 261b, 2811b Shaft
251, 261 Guide roller
252, 291 Tension applier
281 Conveyor
263 Roller supporter
264 Guide driver
272 Print head
273, 1712, 1732 Die unit
275 Supporter driver
282 Film presser
288 Hopper
289 Workpiece feeding device
293 Slide guide
293a Curved surface
321 Shaft
322, 1162, 1172, 1422, 2522, 2822 Arm
322a, 4033 Chuck unit
322b Exhaust pipe
323 Shaft driver
331 Belt conveyor
901 CPU
902 Main storage
903 Auxiliary storage
904 Input interface
905 Output interface
909 Bus
911 Container film image acquirer
912 Packaging pack image acquirer
913 Container film pocket position calculator
914 Packaging pack pocket position calculator
915 Mark position calculator
916 Position shift amount calculator
917 Determiner
918 Pocket molding position correction amount calculator
919 Punching position correction amount calculator
920 Slit position correction amount calculator
921 Mark position correction amount calculator
922 Chuck feed controller
923 Conveyance controller
924 Film guide position controller
925 Printing controller
926 Slit position controller
931 Regular dimension storage
932 Determination criteria storage
1141, 1142 Holding mechanism
1141a, 1142a, 2321 Chuck
1423 Arm driver
1154b, 2812 Roller driver
1532, 2922 Powder clutch brake
1711, 1731 Main body
1713 Head supporter
1714, 1734 Head
1714a, 1734a Cutter
1716, 1736 Guide rod
1717, 1737 Power transfer arm
1721 Slit forming device driver
1722 Punching device driver
1732a Opening
2322 Chuck movement mechanism
2811 Film feeding roller
2811c Recess
2831 Film guide
2931a Guide main body
2831b Auxiliary plate
2831c Support member
2831d Groove
2832 Guide driver
2901, 2902 Heat transfer plate
2903, 2904 Driving unit
4331 Head supporter
4331a, 4333a Pipe
4332 Suction pad
4333 Suction head
A1, A2, A3, A5, A41, A42, A61, A62, a1, a2, a4, a31, a32, a33 Shortest distance
AA32 Non-adhesion region
B1, B2, B3, B41, B42, b1, b2, b31, b32, b33, W1, W2 Distance
BL1 Boundary portion
BP1, BP2 Packaging pack
ΔAc, ΔAf, ΔAm, ΔAs, Δac, Δam, Δas Position shift amount
F1 Raw material film
F2 Container film
F3 Cover film
F4 Pack film
F5 Scrap
MK1 Mark
P1 Region
Po1 Pocket
SL1, SL2, SL21, SL22 Slit

The invention claimed is:

1. A packaging machine for manufacturing a packaging pack by punching, in a state in which a workpiece is stored in a pocket, for storing the workpiece, of a container film in which the pocket is formed, a belt-like pack film obtained by a cover film being adhered to the container film so as to close the pocket, the packaging machine comprising:
a first conveyor that includes a film feeding roller on which the pack film is wound, and that intermittently rotates the film feeding roller one predetermined rotation angle at a time to intermittently feed the pack film one predetermined first reference distance at a time;
a punching device that punches the pack film when the pack film intermittently conveyed by the first conveyor is stopped;
a first film position changer that includes a guider that is disposed downstream of the first conveyor and that guides the pack film, and that changes a position of the guider in a width direction of the pack film to change a position in the width direction of the pack film in the punching device;
a first imager that images the packaging pack punched by the punching device;
a position shift amount calculator that calculates, based on a packaging pack image of the packaging pack imaged by the first imager, a position shift amount of a punching position of the pack film by the punching device;
a punching position correction amount calculator that calculates, from the position shift amount of the punching position, a punching position correction amount with respect to the punching position;
a rotation angle adjuster that adjusts, based on the punching position correction amount, the rotation angle;
a guider position adjuster that adjusts, based on the punching position correction amount, the position of the guider;

a slit forming device that forms a slit in the pack film when the pack film intermittently conveyed by the first conveyor is stopped;

a second film position changer that includes a first guide roller that guides the pack film to be fed to the slit forming device, and moves the first guide roller in a conveyance direction of the pack film or in a width direction of the pack film to change the position of the pack film in the slit forming device;

a slit position correction amount calculator that calculates a slit position correction amount with respect to a slit position where the slit is to be formed; and a first guide roller position adjuster that adjusts, based on the slit position correction amount, a position of the first guide roller, wherein the position shift amount calculator further calculates, based on the packaging pack image, a slit position shift amount with respect to the slit position, and the slit position correction amount calculator calculates the slit position correction amount from the slit position shift amount.

2. The packaging machine according to claim 1, wherein when the rotation angle is changed by the rotation angle adjuster, the first guide roller position adjuster adjusts the position of the first guide roller so as to reduce the slit position shift amount in the conveyance direction of the pack film resulting from the change of the rotation angle.

3. The packaging machine according to claim 2, further comprising:

a printing device including a print head that prints a predetermined mark on the pack film when the pack film intermittently conveyed by the first conveyor is stopped;

a mark position correction amount calculator that calculates a mark position correction amount with respect to a mark position where the mark is formed; and a print head position adjuster that adjusts, based on the mark position correction amount, a position of the print head, wherein the position shift amount calculator further calculates, based on the packaging pack image, a mark position shift amount of the mark, and the mark position correction amount calculator calculates the mark position correction amount from the mark position shift amount.

4. The packaging machine according to claim 2, further comprising:

a raw material film feeding unit that feeds a belt-like raw material film that serves as a source of the container film;

a molding device that produces the belt-like container film by molding the pocket in the raw material film fed from the raw material film feeding unit;

a cover film feeding unit that feeds the belt-like cover film;

a sealing device that seals the pocket by adhering the cover film to the container film while the workpiece is stored in the pocket of the container film;

a second imager that is disposed upstream of the sealing device and that images the container film;

a second conveyor that is disposed downstream of the molding device, and clamps the container film from a thickness direction to intermittently convey the container film downstream one predetermined second reference distance at time;

a pocket molding position correction amount calculator that calculates a pocket molding position correction amount with respect to a pocket molding position at which the pocket is to be molded; and a feed amount adjuster that adjusts, based on the pocket molding position correction amount, the second reference distance, wherein the position shift amount calculator calculates, based on a container film image of the container film imaged by the second imager, a pocket molding position shift amount with respect to the pocket molding position, and the pocket molding position correction amount calculator calculates the pocket molding position correction amount from the pocket molding position shift amount.

5. The packaging machine according to claim 2, further comprising:

a packaging pack holding device that includes a shaft, an arm including a first end to which the shaft is fixed and a second end on which a chuck unit that holds the packaging pack is provided, and an arm driver that rotates the shaft to swivel the arm, wherein the arm driver swivels the arm to dispose the chuck unit at a first position for receiving the packaging pack from the punching device or a second position for imaging, by the first imager, the packaging pack held by the chuck unit.

6. The packaging machine according to claim 1, further comprising:

a printing device including a print head that prints a predetermined mark on the pack film when the pack film intermittently conveyed by the first conveyor is stopped;

a mark position correction amount calculator that calculates a mark position correction amount with respect to a mark position where the mark is formed; and a print head position adjuster that adjusts, based on the mark position correction amount, a position of the print head, wherein the position shift amount calculator further calculates, based on the packaging pack image, a mark position shift amount of the mark, and the mark position correction amount calculator calculates the mark position correction amount from the mark position shift amount.

7. The packaging machine according to claim 1, further comprising:

a raw material film feeding unit that feeds a belt-like raw material film that serves as a source of the container film;

a molding device that produces the belt-like container film by molding the pocket in the raw material film fed from the raw material film feeding unit;

a cover film feeding unit that feeds the belt-like cover film;

a sealing device that seals the pocket by adhering the cover film to the container film while the workpiece is stored in the pocket of the container film;

a second imager that is disposed upstream of the sealing device and that images the container film;

a second conveyor that is disposed downstream of the molding device, and clamps the container film from a thickness direction to intermittently convey the container film downstream one predetermined second reference distance at time;

a pocket molding position correction amount calculator that calculates a pocket molding position correction amount with respect to a pocket molding position at which the pocket is to be molded; and a feed amount adjuster that adjusts, based on the pocket molding position correction amount, the second reference distance, wherein the position shift amount calculator calculates, based on a container film image of the container film imaged by the second imager, a pocket molding position shift amount with respect to the pocket molding position, and the pocket molding position correction amount calculator calculates the pocket molding position correction amount from the pocket molding position shift amount.

8. The packaging machine according to claim 1, further comprising:

a packaging pack holding device that includes a shaft, an arm including a first end to which the shaft is fixed and a second end on which a chuck unit that holds the packaging pack is provided, and an arm driver that rotates the shaft to swivel the arm, wherein the arm driver swivels the arm to dispose the chuck unit at a first position for receiving the packaging pack from the punching device or a second position for imaging, by the first imager, the packaging pack held by the chuck unit.

9. A packaging machine for manufacturing a packaging pack by punching, in a state in which a workpiece is stored in a pocket, for storing the workpiece, of a container film in which the pocket is formed, a belt-like pack film obtained by a cover film being adhered to the container film so as to close the pocket, the packaging machine comprising:

a first conveyor that includes a film feeding roller on which the pack film is wound, and that intermittently rotates the film feeding roller one predetermined rotation angle at a time to intermittently feed the pack film one predetermined first reference distance at a time;

a punching device that punches the pack film when the pack film intermittently conveyed by the first conveyor is stopped;

a first film position changer that includes a guider that is disposed downstream of the first conveyor and that guides the pack film, and that changes a position of the guider in a width direction of the pack film to change a position in the width direction of the pack film in the punching device;

a first imager that images the packaging pack punched by the punching device;

a position shift amount calculator that calculates, based on a packaging pack image of the packaging pack imaged by the first imager, a position shift amount of a punching position of the pack film by the punching device;

a punching position correction amount calculator that calculates, from the position shift amount of the punching position, a punching position correction amount with respect to the punching position;

a rotation angle adjuster that adjusts, based on the punching position correction amount, the rotation angle;

a guider position adjuster that adjusts, based on the punching position correction amount, the position of the guider;

a printing device including a print head that prints a predetermined mark on the pack film when the pack film intermittently conveyed by the first conveyor is stopped;

a mark position correction amount calculator that calculates a mark position correction amount with respect to a mark position where the mark is formed; and a print head position adjuster that adjusts, based on the mark position correction amount, a position of the print head, wherein the position shift amount calculator further calculates, based on the packaging pack image, a mark position shift amount of the mark, and the mark position correction amount calculator calculates the mark position correction amount from the mark position shift amount.

10. The packaging machine according to claim 9, wherein when the rotation angle is changed by the rotation angle adjuster, the print head position adjuster adjusts the position of the print head so as to reduce the mark position shift amount in the conveyance direction of the pack film resulting from the change of the rotation angle.

11. The packaging machine according to claim 10, further comprising:

a raw material film feeding unit that feeds a belt-like raw material film that serves as a source of the container film;

a molding device that produces the belt-like container film by molding the pocket in the raw material film fed from the raw material film feeding unit;

a cover film feeding unit that feeds the belt-like cover film;

a sealing device that seals the pocket by adhering the cover film to the container film while the workpiece is stored in the pocket of the container film;

a second imager that is disposed upstream of the sealing device and that images the container film;

a second conveyor that is disposed downstream of the molding device, and clamps the container film from a thickness direction to intermittently convey the container film downstream one predetermined second reference distance at time;

a pocket molding position correction amount calculator that calculates a pocket molding position correction amount with respect to a pocket molding position at which the pocket is to be molded; and a feed amount adjuster that adjusts, based on the pocket molding position correction amount, the second reference distance, wherein the position shift amount calculator calculates, based on a container film image of the container film imaged by the second imager, a pocket molding position shift amount with respect to the pocket molding position, and the pocket molding position correction amount calculator calculates the pocket molding position correction amount from the pocket molding position shift amount.

12. The packaging machine according to claim 9, further comprising:

a raw material film feeding unit that feeds a belt-like raw material film that serves as a source of the container film;

a molding device that produces the belt-like container film by molding the pocket in the raw material film fed from the raw material film feeding unit;

a cover film feeding unit that feeds the belt-like cover film;

a sealing device that seals the pocket by adhering the cover film to the container film while the workpiece is stored in the pocket of the container film;

a second imager that is disposed upstream of the sealing device and that images the container film;

a second conveyor that is disposed downstream of the molding device, and clamps the container film from a thickness direction to intermittently convey the container film downstream one predetermined second reference distance at time;

a pocket molding position correction amount calculator that calculates a pocket molding position correction amount with respect to a pocket molding position at which the pocket is to be molded; and a feed amount adjuster that adjusts, based on the pocket molding position correction amount, the second reference distance, wherein the position shift amount calculator calculates, based on a container film image of the container film imaged by the second imager, a pocket molding position shift amount with respect to the pocket molding position, and the pocket molding position correction amount calculator calculates the pocket molding position correction amount from the pocket molding position shift amount.

13. The packaging machine according to claim 9, further comprising:

a packaging pack holding device that includes a shaft, an arm including a first end to which the shaft is fixed and a second end on which a chuck unit that holds the packaging pack is provided, and an arm driver that rotates the shaft to swivel the arm, wherein the arm driver swivels the arm to dispose the chuck unit at a first position for receiving the packaging pack from the punching device or a second position for imaging, by the first imager, the packaging pack held by the chuck unit.

14. A packaging machine for manufacturing a packaging pack by punching, in a state in which a workpiece is stored in a pocket, for storing the workpiece, of a container film in which the pocket is formed, a belt-like pack film obtained by a cover film being adhered to the container film so as to close the pocket, the packaging machine comprising:

a first conveyor that includes a film feeding roller on which the pack film is wound, and that intermittently rotates the film feeding roller one predetermined rotation angle at a time to intermittently feed the pack film one predetermined first reference distance at a time;

a punching device that punches the pack film when the pack film intermittently conveyed by the first conveyor is stopped;

a first film position changer that includes a guider that is disposed downstream of the first conveyor and that guides the pack film, and that changes a position of the guider in a width direction of the pack film to change a position in the width direction of the pack film in the punching device;

a first imager that images the packaging pack punched by the punching device;

a position shift amount calculator that calculates, based on a packaging pack image of the packaging pack imaged by the first imager, a position shift amount of a punching position of the pack film by the punching device;

a punching position correction amount calculator that calculates, from the position shift amount of the punching position, a punching position correction amount with respect to the punching position;

a rotation angle adjuster that adjusts, based on the punching position correction amount, the rotation angle;

a guider position adjuster that adjusts, based on the punching position correction amount, the position of the guider;

a raw material film feeding unit that feeds a belt-like raw material film that serves as a source of the container film;

a molding device that produces the belt-like container film by molding the pocket in the raw material film fed from the raw material film feeding unit;

a cover film feeding unit that feeds the belt-like cover film;

a sealing device that seals the pocket by adhering the cover film to the container film while the workpiece is stored in the pocket of the container film;

a second imager that is disposed upstream of the sealing device and that images the container film;

a second conveyor that is disposed downstream of the molding device, and clamps the container film from a thickness direction to intermittently convey the container film downstream one predetermined second reference distance at time;

a pocket molding position correction amount calculator that calculates a pocket molding position correction amount with respect to a pocket molding position at which the pocket is to be molded; and a feed amount adjuster that adjusts, based on the pocket molding position correction amount, the second reference distance, wherein the position shift amount calculator calculates, based on a container film image of the container film imaged by the second imager, a pocket molding position shift amount with respect to the pocket molding position, and the pocket molding position correction amount calculator calculates the pocket molding position correction amount from the pocket molding position shift amount.

15. The packaging machine according to claim 14, further comprising:

an edge sensor that is disposed downstream of the molding device and that detects positions of both edges of the container film in the width direction;

a third film position changer that includes a second guide roller that guides the raw material film to be fed to the molding device, and moves the second guide roller in a width direction of the raw material film to change a position of the raw material film in the molding device;

a raw material film position correction amount calculator that calculates, based on the positions of both edges of the container film detected by the edge sensor, a raw material film position correction amount of the raw material film in the width direction; and a second guide roller position adjuster that adjusts, based on the raw material film position correction amount, a position of the second guide roller.

16. The packaging machine according to claim 14, wherein the cover film includes an adhesion region that is caused to adhere to the container film, and a non-adhesion region that is disposed at a position of the container film facing the pocket and that is not caused to adhere to the container film, the position shift amount calculator further calculates, based on the packaging pack image imaged by the first imager, a non-adhesion region position shift amount of the non-adhesion region with respect to a position of the pocket, and the pocket molding position correction amount calculator calculates the pocket molding position correction amount from the non-adhesion region position shift amount.

17. The packaging machine according to claim 16, wherein the cover film includes an adhesion region that is caused to adhere to the container film, and a non-adhesion region that is disposed at a position of the container film facing the pocket and that is not caused to adhere to the container film, the position shift amount calculator further calculates, based on the packaging pack image imaged by the first imager, a non-adhesion region position shift amount of the non-adhesion region with respect to a position of the pocket, and the pocket molding position correction amount calculator calculates the pocket molding position correction amount from the non-adhesion region position shift amount.

18. A packaging machine for manufacturing a packaging pack by punching, in a state in which a workpiece is stored in a pocket, for storing the workpiece, of a container film in which the pocket is formed, a belt-like pack film obtained by a cover film being adhered to the container film so as to close the pocket, the packaging machine comprising:

a first conveyor that includes a film feeding roller on which the pack film is wound, and that intermittently rotates the film feeding roller one predetermined rotation angle at a time to intermittently feed the pack film one predetermined first reference distance at a time;

a punching device that punches the pack film when the pack film intermittently conveyed by the first conveyor is stopped;

a first film position changer that includes a guider that is disposed downstream of the first conveyor and that guides the pack film, and that changes a position of the guider in a width direction of the pack film to change a position in the width direction of the pack film in the punching device;

a first imager that images the packaging pack punched by the punching device;

a position shift amount calculator that calculates, based on a packaging pack image of the packaging pack imaged by the first imager, a position shift amount of a punching position of the pack film by the punching device;

a punching position correction amount calculator that calculates, from the position shift amount of the punching position, a punching position correction amount with respect to the punching position;

a rotation angle adjuster that adjusts, based on the punching position correction amount, the rotation angle;

a guider position adjuster that adjusts, based on the punching position correction amount, the position of the guider; and a packaging pack holding device that includes a shaft, an arm including a first end to which the shaft is fixed and a second end on which a chuck unit that holds the packaging pack is provided, and an arm driver that rotates the shaft to swivel the arm, wherein the arm driver swivels the arm to dispose the chuck unit at at least one of a first position for receiving the packaging pack from the punching device or a second position for imaging, by the first imager, the packaging pack held by the chuck unit.

19. The packaging machine according to claim 18, wherein the chuck unit includes
a plurality of suction heads,
a suction pad mounted on a tip of each of the plurality of section heads, and
a head supporter that collectively supports the plurality of suction heads and that is attachable/detachable from the arm.

* * * * *